(12) United States Patent
Wang et al.

(10) Patent No.: US 12,311,870 B2
(45) Date of Patent: *May 27, 2025

(54) WEBBING HEIGHT ADJUSTING UNIT AND WEBBING HEIGHT ADJUSTING DEVICE

(71) Applicant: HORNLING INDUSTRIAL INC., Tainan (TW)

(72) Inventors: Liang-Hsiung Wang, Tainan (TW); Chia-Chun Chu, Tainan (TW)

(73) Assignee: HORNLING INDUSTRIAL INC., Tainan (TW)

( * ) Notice: Subject to any disclaimer, the term of this patent is extended or adjusted under 35 U.S.C. 154(b) by 0 days.

This patent is subject to a terminal disclaimer.

(21) Appl. No.: 18/743,169

(22) Filed: Jun. 14, 2024

(65) Prior Publication Data

US 2025/0145109 A1  May 8, 2025

(30) Foreign Application Priority Data

Nov. 8, 2023 (TW) ................................. 112143081

(51) Int. Cl.
*B60R 22/20* (2006.01)
(52) U.S. Cl.
CPC .................... *B60R 22/20* (2013.01)
(58) Field of Classification Search
CPC ................. B60R 22/20; B60R 22/30
See application file for complete search history.

(56) References Cited

U.S. PATENT DOCUMENTS

| 3,860,261 | A | * | 1/1975 | Takada | B60R 22/023 |
| | | | | | 297/483 |
| 4,243,266 | A | * | 1/1981 | Anderson | B60R 22/30 |
| | | | | | 297/483 |
| 7,506,413 | B2 | * | 3/2009 | Dingman | B60R 22/20 |
| | | | | | 24/193 |
| 7,703,806 | B2 | * | 4/2010 | Bell | B60R 22/024 |
| | | | | | 297/483 |
| 8,052,170 | B2 | * | 11/2011 | Pelliccia | B60R 22/26 |
| | | | | | 297/483 |
| 9,156,435 | B2 | * | 10/2015 | Smith | B60N 2/242 |
| 9,499,121 | B2 | * | 11/2016 | Dingman | B60R 22/28 |

(Continued)

FOREIGN PATENT DOCUMENTS

| TW | 201806806 | 3/2018 |
| TW | 201922542 | 6/2019 |

*Primary Examiner* — Laura Freedman
(74) *Attorney, Agent, or Firm* — WPAT, PC

(57) ABSTRACT

A webbing height adjusting device and a webbing height adjusting unit thereof is applied in a three-point seat belt system. The webbing height adjusting unit has an adjuster base, a slider, an elastic member for actuating the adjuster base and the slider to clamp an object, and an outer shell disposed on the adjuster base. The webbing height adjusting device has a supplementary webbing and a D-loop connected to each other and disposed in a vehicle. The webbing height adjusting unit is connected to a main webbing in the three-point seat belt system to form an adjustable top position and clamps the supplementary webbing. Increase of a tension of the main webbing enhances clamping of the webbing height adjusting unit. The adjuster base and the slider are simple and convenient in operation to unclamp the supplementary webbing and adjust a height position of the webbing height adjusting unit.

28 Claims, 27 Drawing Sheets

(56) References Cited

U.S. PATENT DOCUMENTS

| | | | |
|---|---|---|---|
| 10,011,245 B2* | 7/2018 | Wang | B60R 22/24 |
| 10,173,635 B2* | 1/2019 | Wang | B60R 22/20 |
| 10,654,442 B2* | 5/2020 | Wang | B60R 22/19 |
| 10,994,694 B2* | 5/2021 | Wang | B60R 22/20 |
| 11,014,527 B2* | 5/2021 | Wang | B60R 22/024 |
| 11,338,766 B2* | 5/2022 | Wang | B60R 22/12 |
| 12,252,093 B1* | 3/2025 | Wang | B60R 22/20 |
| 2016/0280102 A1 | 9/2016 | Liuska | |

* cited by examiner

WEBBING HEIGHT ADJUSTING UNIT AND WEBBING HEIGHT ADJUSTING DEVICE

BACKGROUND OF THE INVENTION

1. Field of the Invention

The present invention relates to a three-point seat belt system in a vehicle, and particularly to a webbing height adjusting unit and a webbing height adjusting device that provides a main webbing of the three-point seat belt system with an adjustable top position.

2. Description of Related Art

In a three-point seat belt system on a seat of vehicles such as cars, trucks, or sport utility vehicles (SUV) for protecting an occupant (e.g. a driver or a passenger), a webbing retractor is disposed on an inner side of a vehicle body near the seat, and a main webbing extending from the webbing retractor extends upward to be mounted through a D-loop on a top of a vehicle pillar of the vehicle body on a side of the seat; an end of the main webbing away from the webbing retractor is fixed on the vehicle pillar. The occupant pulls the main webbing downward, obliquely places the main webbing in front of the shoulder and the chest, and inserts a tongue mounted on the main webbing into a buckle on the other side of the seat away from the webbing retractor to allow a section of the main webbing between the tongue and the end of the main webbing to be laterally placed in front of the pelvis of the occupant, which forms the three-point seat belt system to secure the occupant on the seat.

In a conventional three-point seat belt system, a front section of the main webbing obliquely placed and abutting the occupant's shoulder and chest needs a sufficient tension to secure the occupant, and generally, a height position of the D-loop can only be adjusted within a limited range; when the main webbing tightly secures the occupant on the seat, if a height of a top position for the main webbing near the shoulder of the occupant cannot be adjusted properly, in emergency, the neck of the occupant may be slashed by the main webbing. Thereby, a webbing height adjuster needs to be disposed to the D-loop on a top section of the vehicle pillar beside the seat to allow the occupant to adjust the height of the top position for the main webbing according to the occupant's body shape, which ensures safety of the three-point seat belt system in use for the occupant. As safety of the occupant is highly regarded, the webbing height adjuster becomes a necessary safety device in the three-point seat belt system.

A conventional webbing height adjuster for the main webbing in the seat belt system (as disclosed in the Webbing Adjustment Device of U.S. Pat. No. 10,654,442) has a guiding ring member, a frame, a slider movably connected to the frame, and a cover sheathed onto the frame. The guiding ring member is disposed above a side of the seat, and the main webbing extending from the webbing retractor is mounted through the frame or a connecting element connected to the frame and then mounted through the guiding ring member; the front section of the main webbing between the guiding ring member and the tongue is mounted through a middle of the frame and the slider. A tension of the main webbing drives the frame and the slider to move relatively so as to tightly clamp and fasten the main webbing, which forms the adjustable top position for the occupant on the seat. When not in use, the webbing adjustment device is hung on the guiding ring member by the cover sheathed onto the frame.

In the conventional webbing height adjuster for the three-point seat belt system mentioned above, the webbing height adjuster is connected to a portion of the main webbing between the front section obliquely abutting the chest and the shoulder of the occupant and a rear section defined between the webbing retractor and the guiding ring member, which allows adjusting the height of the top position for the main webbing. However, the webbing height adjuster passively clamps and fastens the main webbing by the tension of the main webbing, and the webbing height adjuster cannot clamp and fasten the main webbing initiatively; as the tension of the main webbing reduces, a clamping force of the webbing height adjuster thus reduces; the webbing height adjuster cannot clamp the main webbing and thus slides downward along the main webbing due to the gravity. Thus, when no occupant is on the seat, the webbing height adjuster slides down along the main webbing to a lower place beside the seat. Hence, the occupant on the seat needs to hang the webbing height adjuster on the guiding ring member by the cover before exiting the vehicle. Thereby, every time after the occupant fastens the main webbing, the occupant needs to take the webbing height adjuster from the guiding ring member and readjust the height position of the webbing height adjuster on the main webbing, which is inconvenient in use.

SUMMARY OF THE INVENTION

The main objective of the present invention is to provide a webbing height adjusting unit and a webbing height adjusting device that solves the problem of the webbing height adjusting unit in the three-point seat belt system disclosed in U.S. Pat. No. 10,654,442 being inconvenient in operation when adjusting the height of the top position.

The webbing height adjusting unit provided by the present invention has an adjuster base, a slider, an elastic member, and an outer shell. The adjuster base has a frame, a webbing-abutting portion, a webbing-mounting portion, a sliding space, and a webbing slot. The webbing-abutting portion is formed on an upper section of the frame, and the sliding space is formed between the webbing-abutting portion and the frame. The webbing-mounting portion is formed on a lower section of the frame, and the webbing slot is formed in the frame and the webbing-mounting portion. The slider is mounted in the sliding space of the adjuster base, is configured to move up and down, and has an inclined slot. The elastic member is disposed between the slider and the adjuster base and is configured to provide a restoring force to allow the slider and the webbing-abutting portion of the adjuster base to clamp an object together. The outer shell is mounted on the adjuster base, is configured to move up and down relative to the adjuster base, and is operable to actuate the slider and the adjuster base to move relatively so as to unclamp the object. When the outer shell is released, the restoring force provided by the elastic member pushes the slider and the adjuster base to move relatively and re-clamp the object.

The webbing height adjusting device provided by the present invention is adapted to be connected to a main webbing extending out from a webbing retractor of a three-point seat belt system of a vehicle, and the webbing height adjusting device has a supplementary webbing component and the webbing height adjusting unit mentioned above. The supplementary webbing component has a D-loop and a supplementary webbing. The D-loop is configured to be connected to an upper position in the vehicle, is configured for the main webbing to be mounted therethrough, and thereby divides the main webbing to a rear section and a front section. The supplementary webbing is configured to be located between the rear section and the front section of the main webbing and has a top end and a bottom end. The top end is connected to the D-loop, and the bottom end is opposite to the top end and is configured to be connected to a lower position in the vehicle. The webbing height adjusting unit is disposed below the D-loop and is configured to be connected to the front section of the main webbing and the supplementary webbing to form an adjustable top position.

By means of the aforementioned technical features, the webbing height adjusting unit and the webbing height adjusting device of the present invention applied in the three-point seat belt system provides efficacy as follows:

1. providing an adjustable top position for the main webbing: the webbing height adjusting device of the present invention are configured to be disposed inside the vehicle and connected to the main webbing, and the webbing height adjusting unit is connected to the supplementary webbing component and the main webbing. The main webbing extending from the webbing retractor is configured to be mounted through the webbing height adjusting unit. Thereby, when the occupant on the seat fastens the main webbing correctly, the main webbing protects the occupant, and the webbing height adjusting unit allows the occupant to manually adjust the height of the top position.
2. providing efficacy of auto-clamping and stable positioning: in the webbing height adjusting unit in the present invention, the slider and the webbing-abutting portion of the adjuster base clamp the supplementary webbing via the elastic member. By the elastic member continuously providing the restoring force toward the slider, the webbing height adjusting unit is assured to automatically clamp and be positioned on the supplementary webbing. When the occupant sits on the seat and fastens the main webbing correctly, the supplementary webbing under the D-loop is mounted through a middle of the webbing-abutting portion and the slider from the first side to the second side of the adjuster base, and the elastic member pushes the slider and the webbing-abutting portion to clamp the supplementary webbing. The front section of the main webbing is mounted through the webbing slot from the first side to the second side of the adjuster base, is bent by the webbing-mounting portion, and then secures the occupant's body on the seat. A retracting force of the webbing retractor acted on the main webbing increases the tension of the main webbing, and the main webbing increases a tension of the supplementary webbing via the webbing height adjusting unit. On the basis of the webbing height adjusting unit initiatively clamps the supplementary webbing, as the tension of the supplementary webbing increases, the clamping force applied on the supplementary webbing by the adjuster base and the slider can thus be improved to provide a better effect of positioning and to maintain the height adjuster at the proper height position after adjustment.
3. convenient and easy in operation: the webbing height adjusting unit in the present invention connected to the front section of the main webbing and the supplementary webbing forms the top position above a side of the occupant on the seat. When adjusting the height position of the webbing height adjusting unit, the occupant only needs to hold the outer shell to push the slider or the adjuster base so as to drive the slider and the adjuster base to overcome the restoring force of the elastic member and move relatively, which easily allows the webbing height adjusting unit to unclamp the supplementary webbing and to move along the supplementary webbing and the main webbing for adjusting its height position. Thereby, the webbing height adjusting unit applied in the three-point seat belt system is simple and convenient in operation for the occupant on the seat.
4. utility of stepless adjustment of the webbing height adjusting unit's height position: the webbing height adjusting unit in the present invention is connected to the front section of the main webbing and the supplementary webbing; specifically, the slider and the webbing-abutting portion of the adjuster base clamp the supplementary webbing under the restoring force of the elastic member, and the main webbing is movably mounted through the webbing slot on a bottom of the adjuster base. Thereby, the webbing height adjusting unit allows the occupant to freely adjust the height position of the webbing height adjusting unit and thus has the utility of stepless adjustment.
5. minimizing the possibility of the webbing height adjusting changing its location when the occupant is secured: as mentioned above, in the webbing height adjusting unit, the slider and the webbing-abutting portion of the adjuster base clamp the supplementary webbing under the restoring force of the elastic member, and the main webbing is movably mounted through the webbing slot on a bottom of the adjuster base. Thereby, when the occupant fastens the main webbing correctly, not only the main webbing extending from the webbing retractor secures the occupant on the seat, but the webbing height adjusting unit also clamps the supplementary webbing more tightly under a tension of the supplementary webbing so as to be fixed at a position. Moreover, a clamping force acted by the webbing height adjusting unit on the supplementary webbing is in a positive correlation with the tension on the main webbing and minimizes the possibility of changing its location.
6. no need for readjusting the position of the webbing height adjusting unit when a same occupant sitting on the seat: as mentioned above, the slider and the webbing-abutting portion of the adjuster base in the webbing height adjusting unit clamp the supplementary webbing under the restoring force of the elastic member, thus allowing the webbing height adjusting unit fixed above a side of the occupant; the main webbing is movably mounted through the webbing slot of the adjuster base. When the occupant leaves the seat after adjusting the position of the webbing height adjusting unit, if no other occupant changes the position of the webbing height adjusting unit, the original occupant needs not readjust the position of the webbing height adjusting unit after backing to the seat.

Further, in the webbing height adjusting device of the present invention, the outer shell may have a bridge portion connected to the second plate portion. The main webbing is mounted through a space between the bridge portion and the second plate portion and then mounted through the webbing slot of the adjuster base. The bridge portion is utilized to guide the direction of the main webbing near the webbing height adjusting unit.

DETAILED DESCRIPTION OF THE PREFERRED EMBODIMENT

Figure 1:
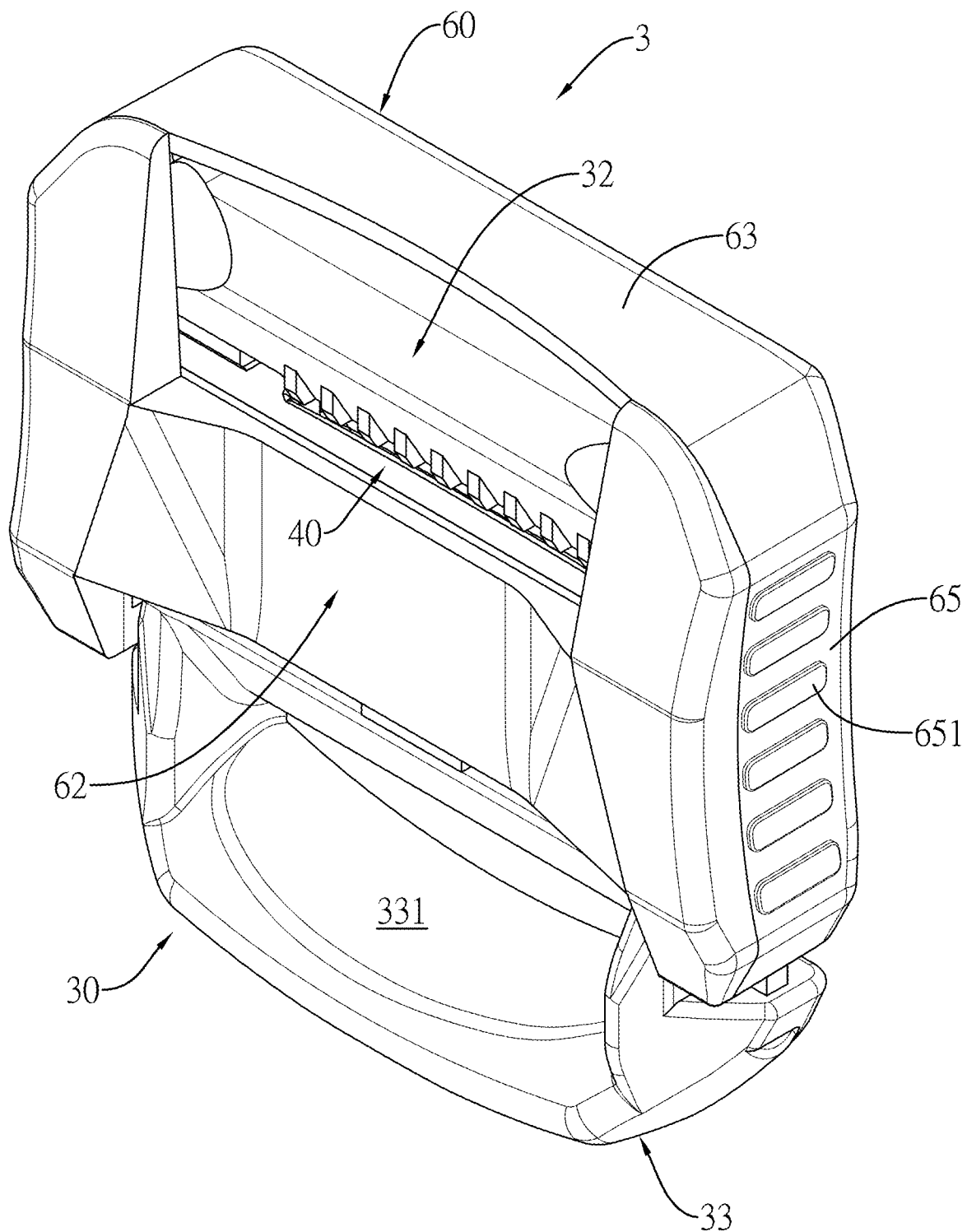
FIG. 1 is a perspective view of a first preferred embodiment of a webbing height adjusting unit in accordance with the present invention.

As disclosed in the summary above, the present invention includes a webbing height adjusting unit and a webbing height adjusting device applied in a three-point seat belt system of a seat in a vehicle. Details of configurations of the webbing height adjusting unit and the webbing height adjusting device are described below with the corresponding figures.

With reference to FIGS. 1 to 5, a first preferred embodiment of the webbing height adjusting unit 3 in accordance with the present invention has an adjuster base 30, a slider 40, an elastic member 50, and an outer shell 60. Details of each component of the webbing height adjusting unit 3 are sequentially described below.

Figure 6:
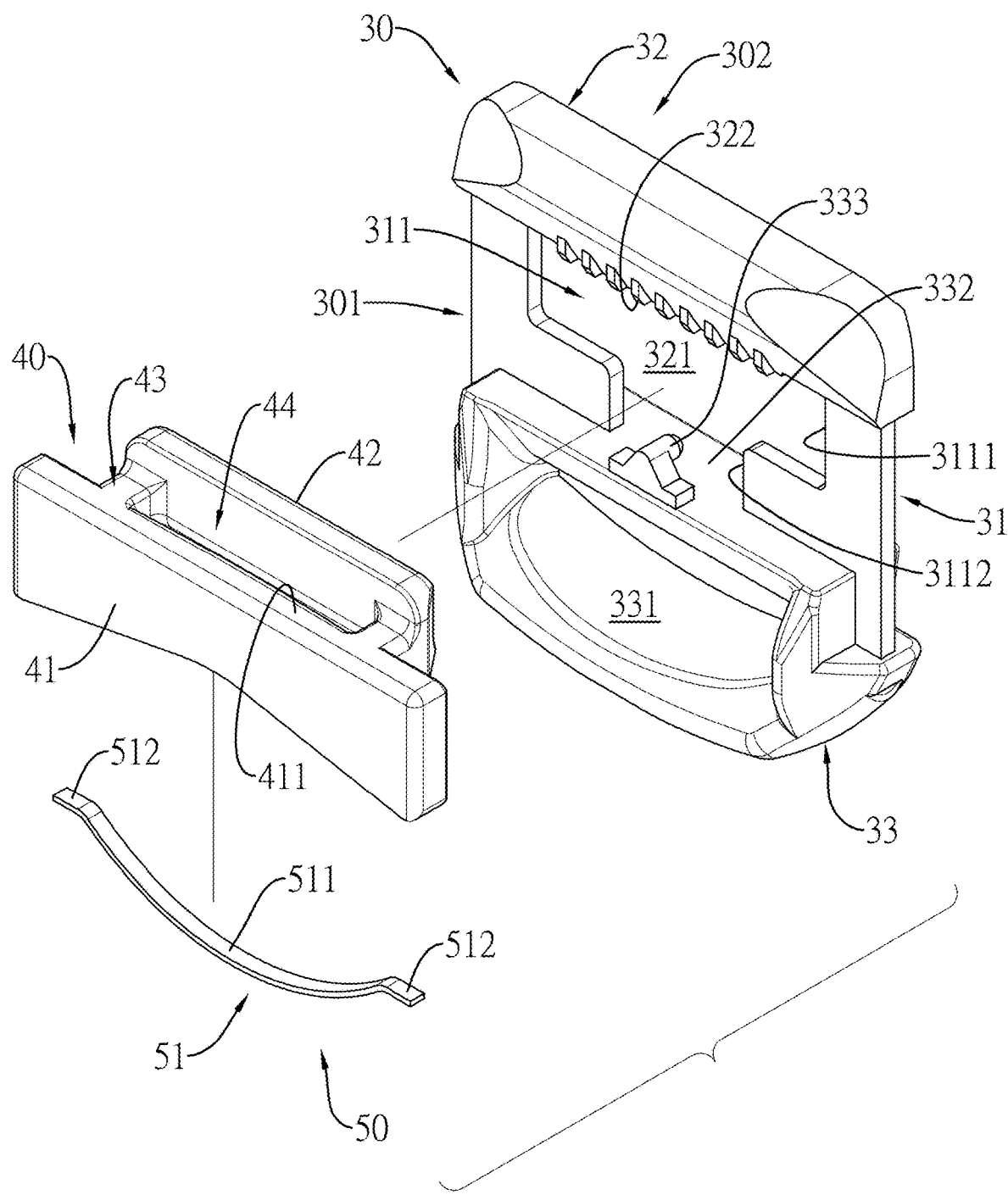
FIG. 6 is an exploded view of an adjuster base, a slider, and an elastic member of the webbing height adjusting unit in FIGS. 1, 2, 4, and 5.
Figure 7:
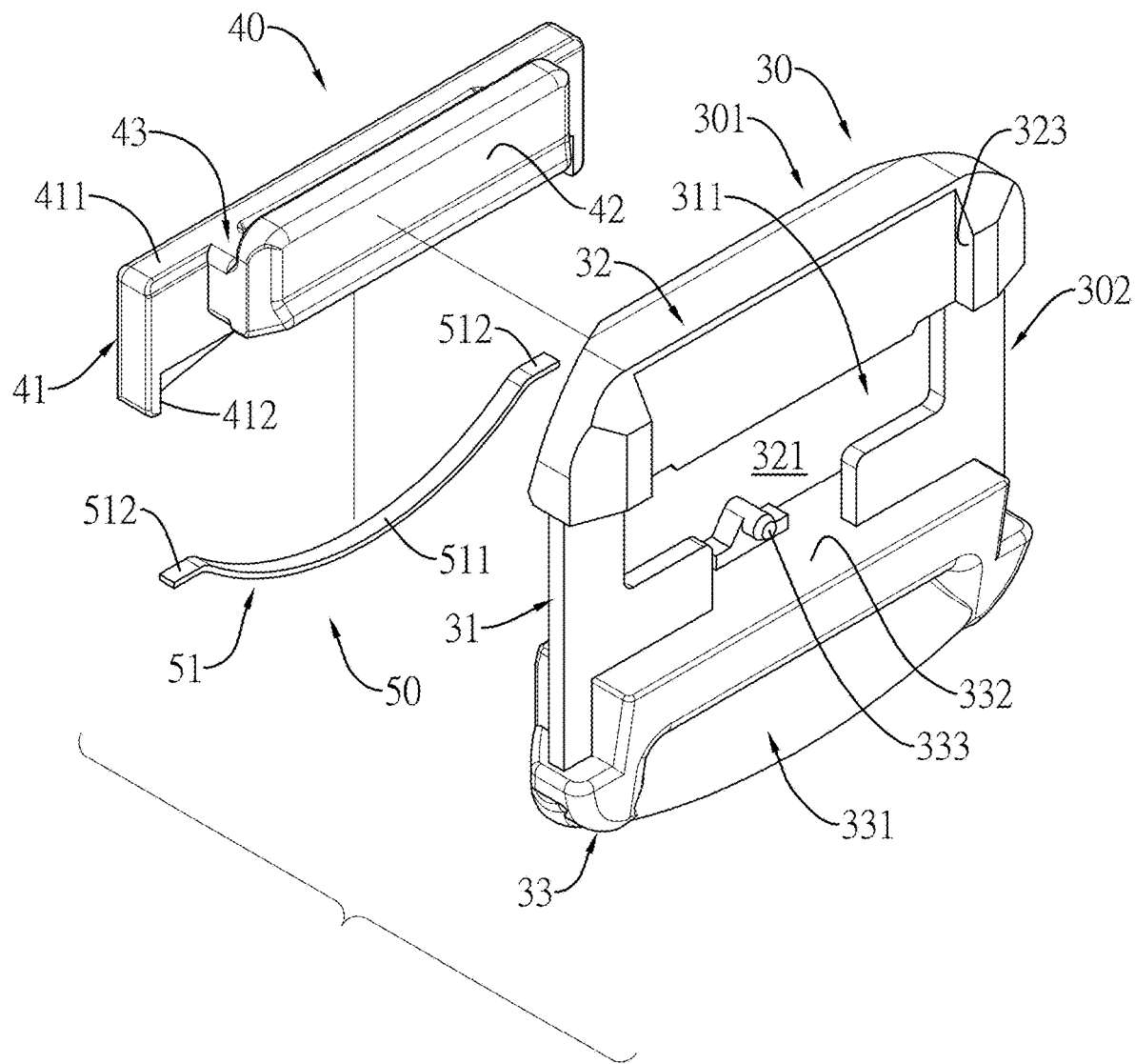
FIG. 7 is another exploded view of the adjuster base, the slider, and the elastic member of the webbing height adjusting unit in FIGS. 1, 2, 4, and 5.
Figure 8:
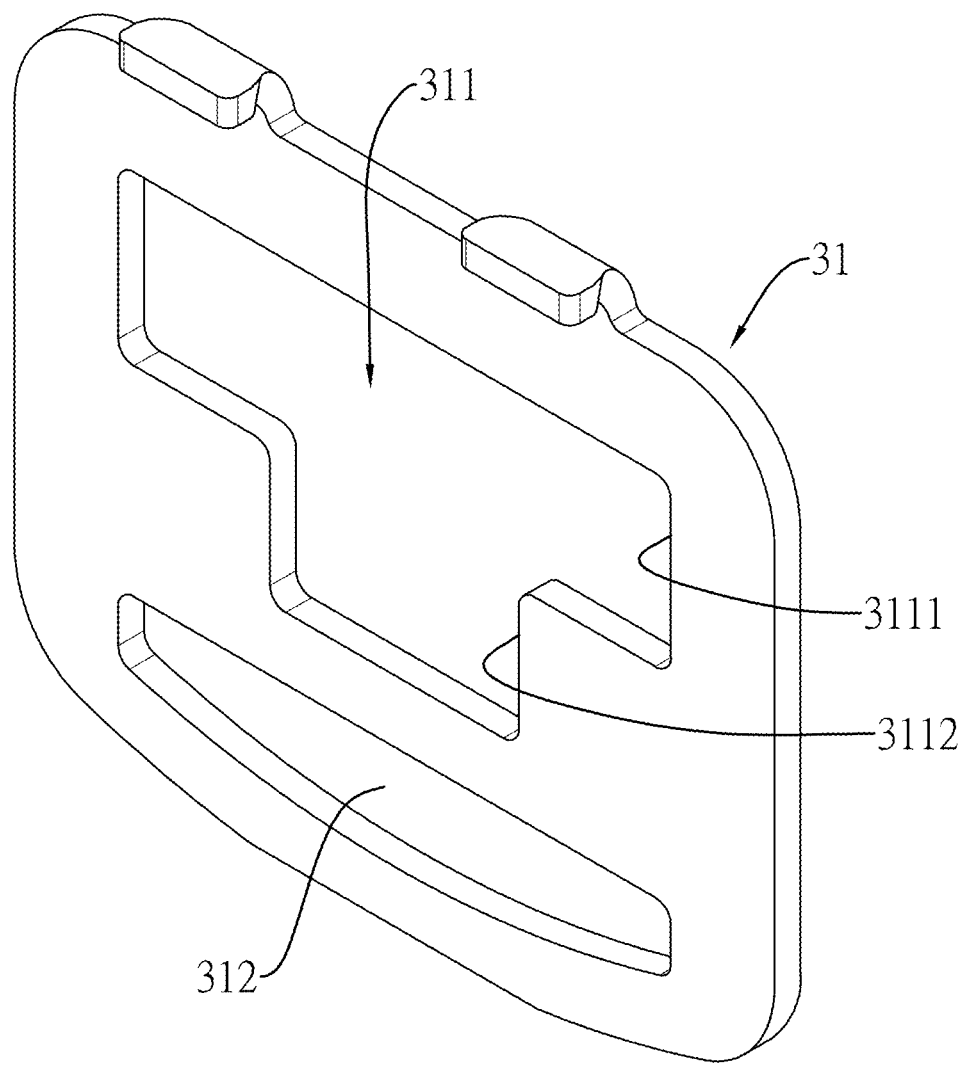
FIG. 8 is a perspective view of a frame of the adjuster base of the webbing height adjusting unit in FIG. 1.

With reference to FIGS. 6 and 7, the adjuster base 30 has a frame 31, a webbing-abutting portion 32 and a webbing-mounting portion 33 formed on an upper section and a lower section of the frame 31, respectively. The adjuster base 30 has a sliding space 321 formed between the webbing-abutting portion 32 and the frame 31 and a webbing slot 331 formed in the webbing-mounting portion 33 and the frame 31.

With reference to FIGS. 4 to 7, and 9, in the first preferred embodiment, two opposite sides of the adjuster base 30 are defined as a first side 301 and a second side 302 respectively, and the frame 31 can be a component made of a rigid material (e.g. ferrous metals or other materials). The frame 31 forms a through hole 311 and a connecting hole 312 therein, and the connecting hole 312 is located below the through hole 311. The through hole 311 has a base section 3111 and an extending section 3112 extending downward from the base section 3111, and a width of the base section 3111 is larger than that of the extending section 3112.

Figure 11:
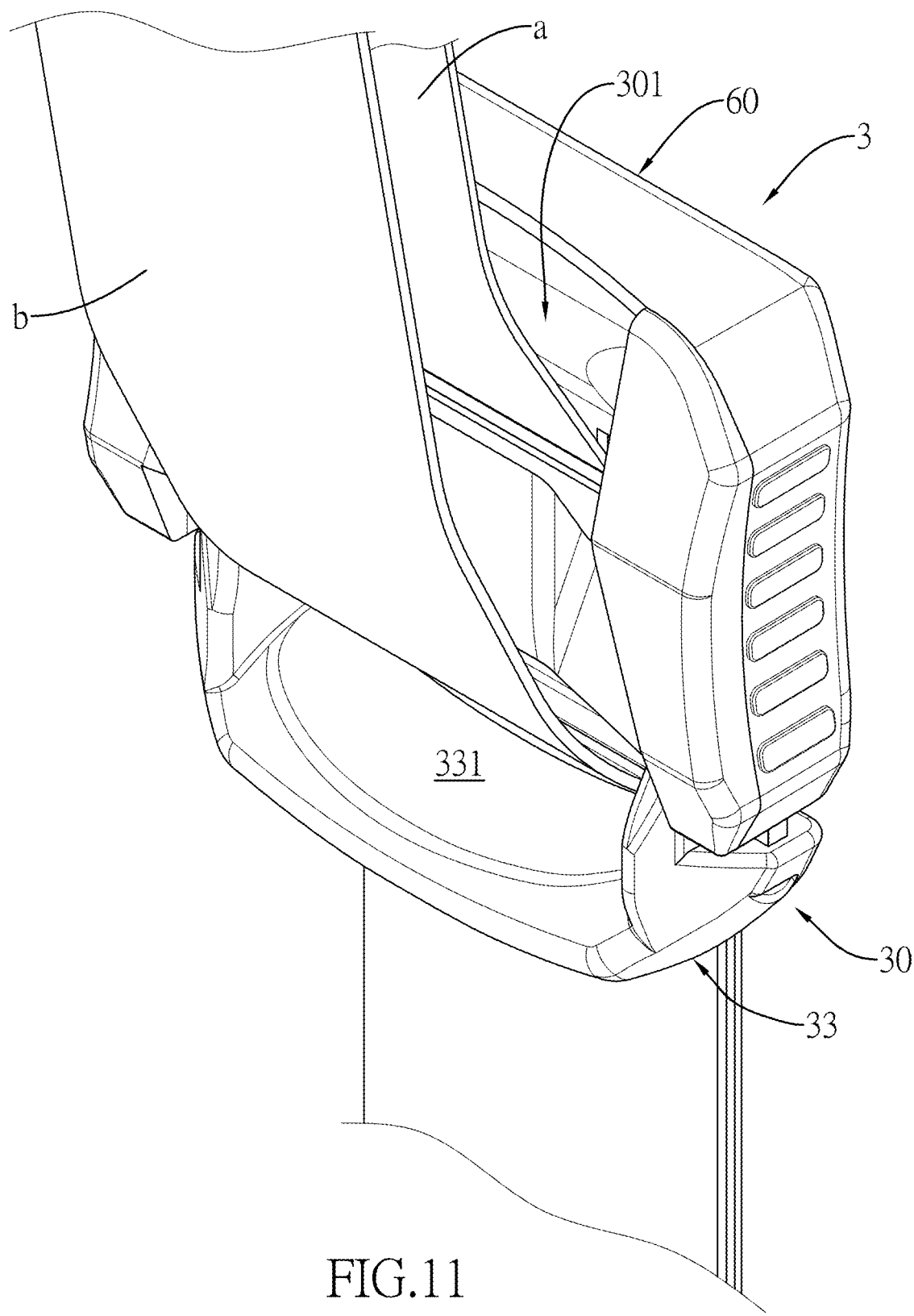
FIG. 11 is a perspective view of the webbing height adjusting unit in FIG. 1 with a first webbing section and a second webbing section mounted therethrough.
Figure 12:
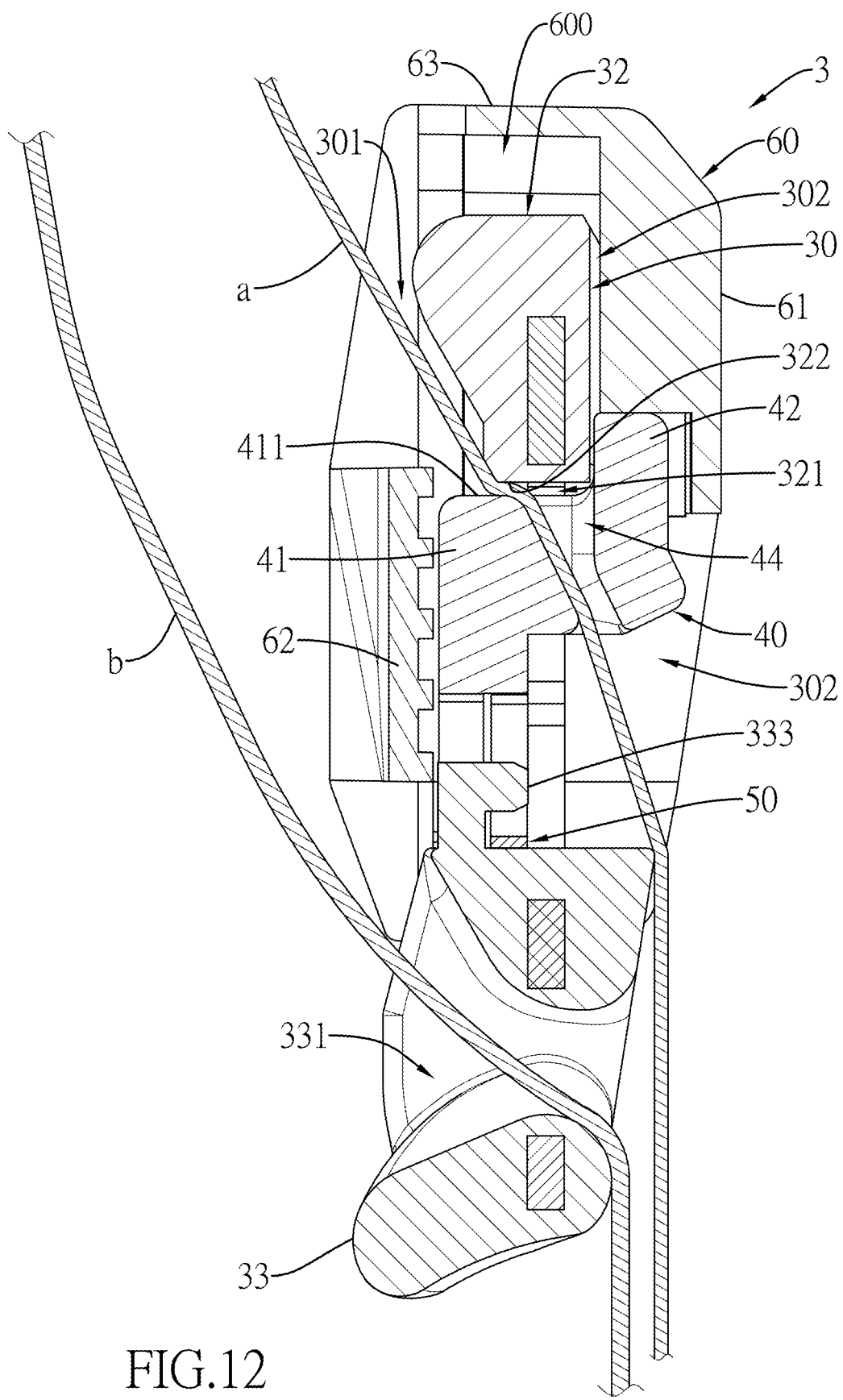
FIG. 12 is a sectional side view of the webbing height adjusting unit in FIG. 1 with the first webbing section and the second webbing section mounted therethrough.
Figure 13:
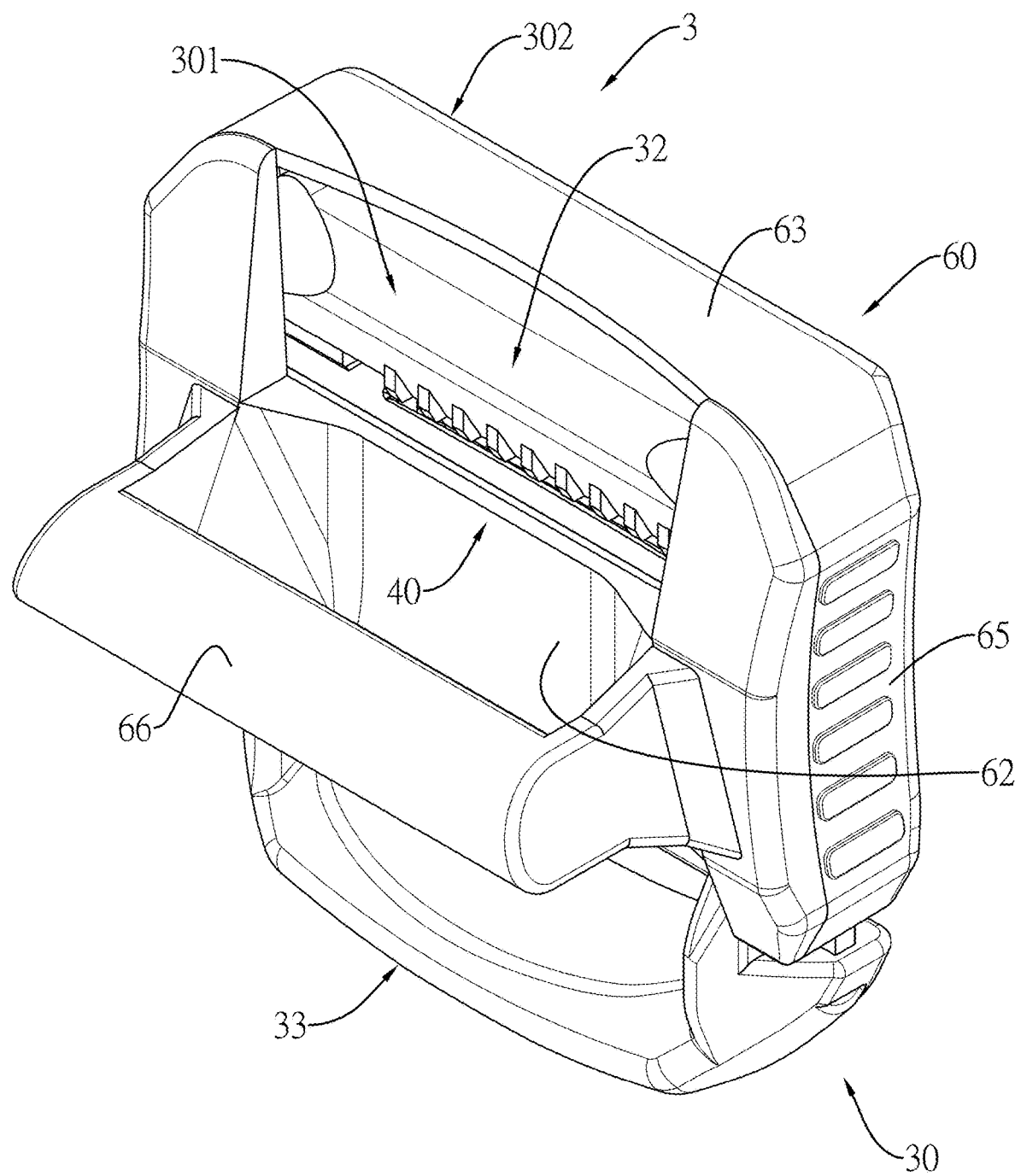
FIG. 13 is a perspective view of a second preferred embodiment of the webbing height adjusting unit in accordance with the present invention.
Figure 14:
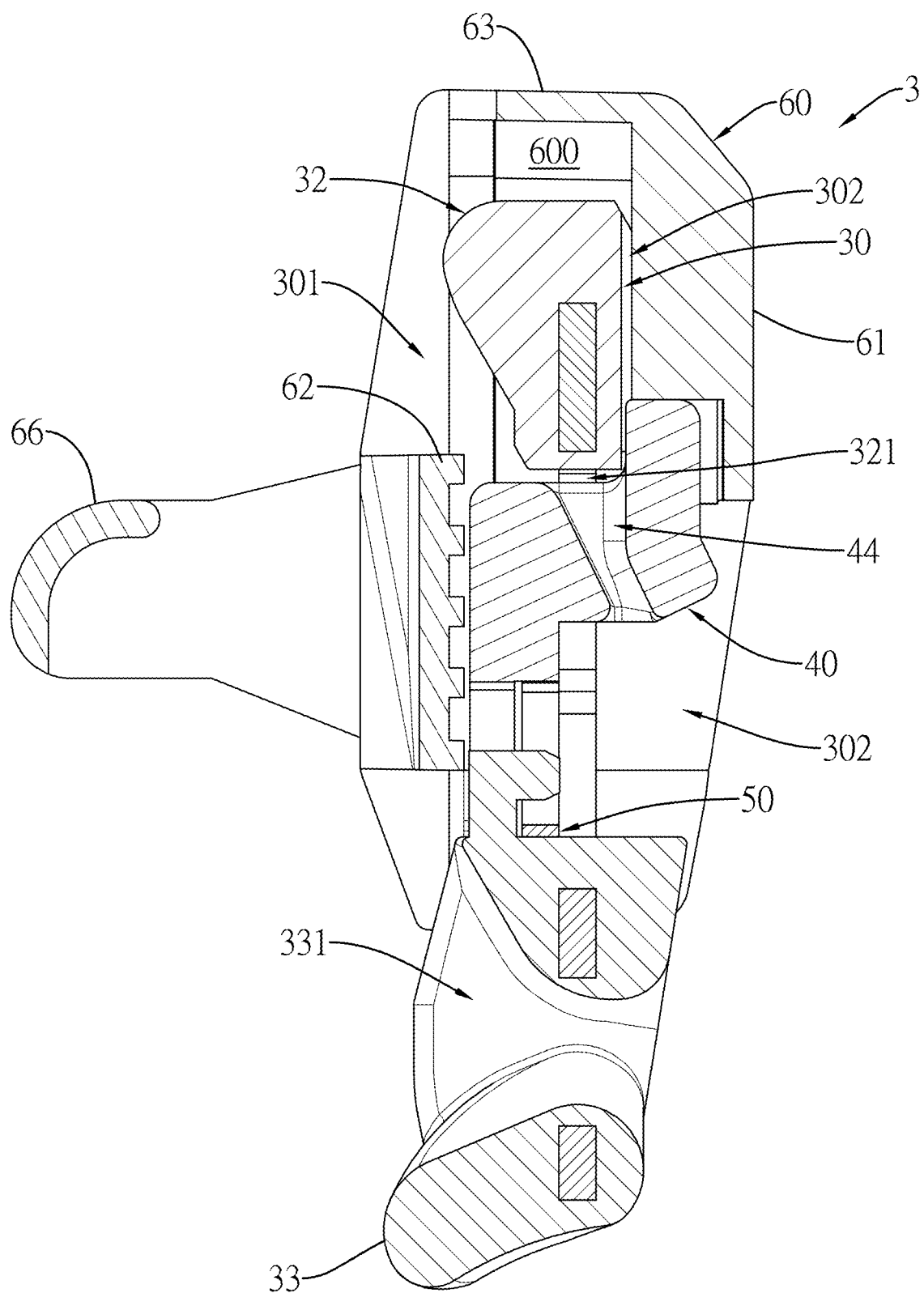
FIG. 14 is a sectional side view of the webbing height adjusting unit in FIG. 13.
Figure 15:
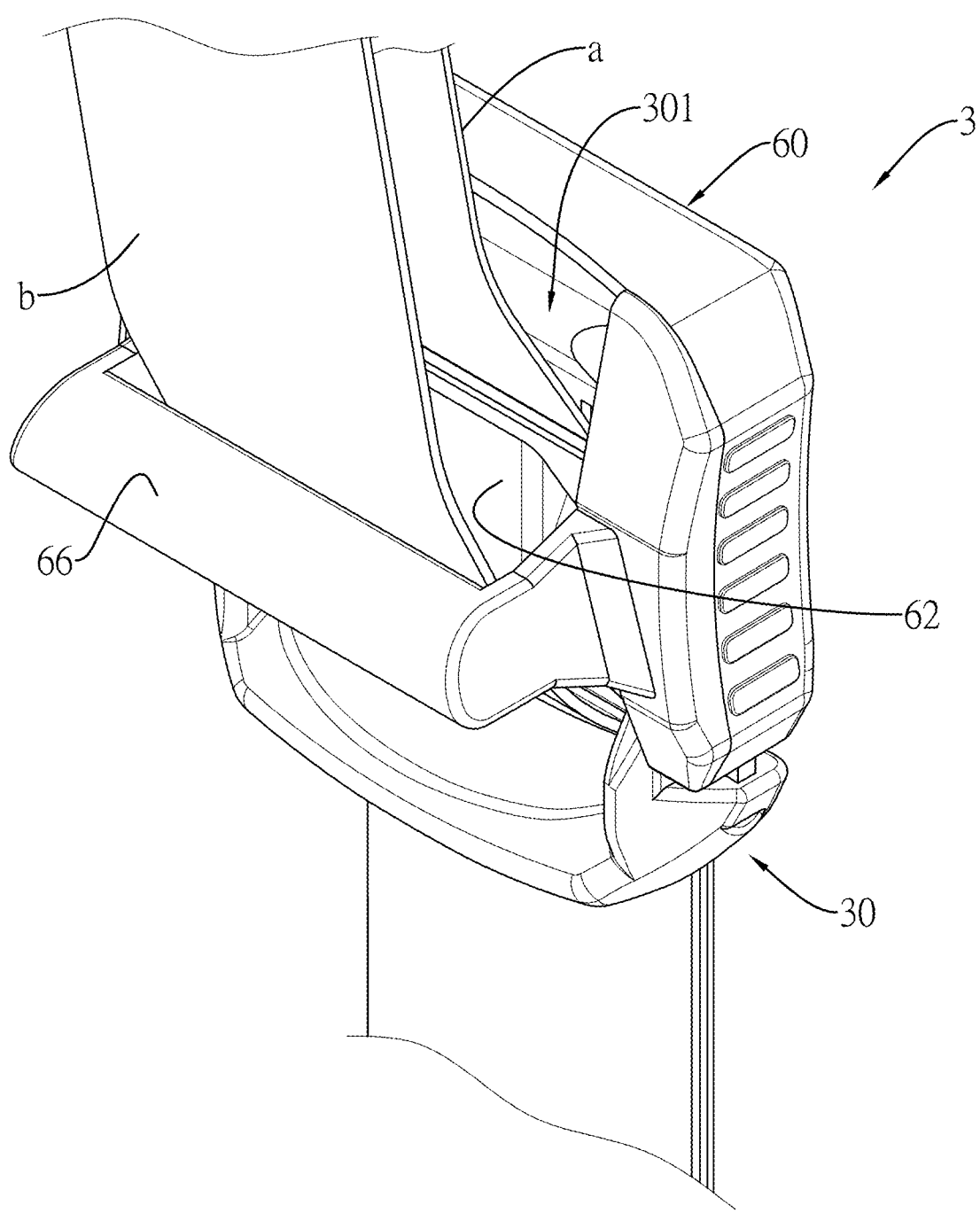
FIG. 15 is a perspective view of the webbing height adjusting unit in FIG. 13 with the first webbing section and the second webbing section mounted therethrough.
Figure 16:
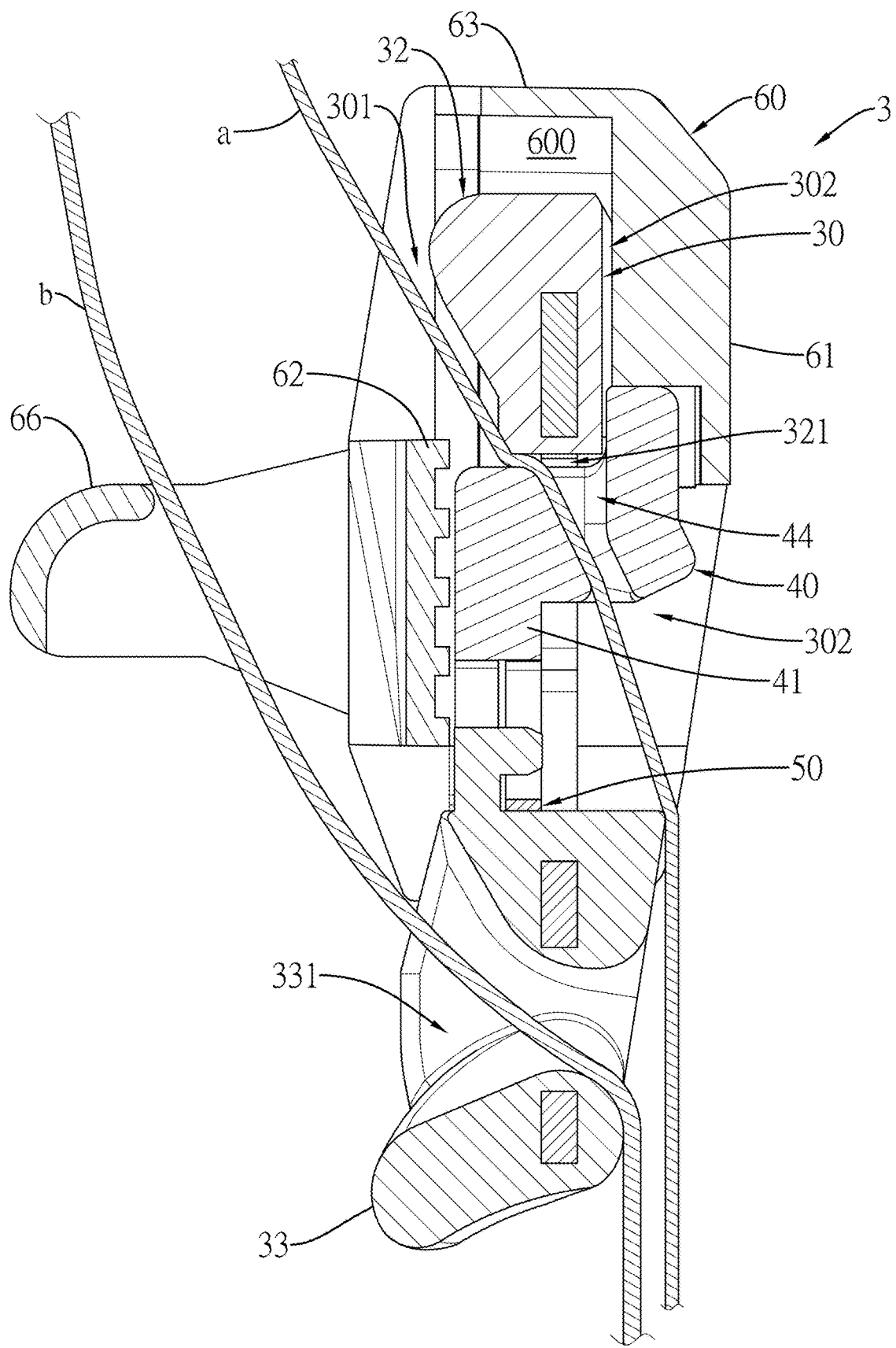
FIG. 16 is a sectional side view of the webbing height adjusting unit in FIG. 13 with the first webbing section and the second webbing section mounted therethrough.

With reference to FIGS. 11 and 12, the sliding space 321 and the webbing slot 331 of the adjuster base 30 are configured for a first webbing section a and a second webbing section b at two different positions in the three-point seat belt system to be mounted therethrough, respectively. The first webbing section a is mounted through the sliding space 321 from the first side 301 of the adjuster base 30 to the second side 302 of the adjuster base 30. The second webbing section b is mounted through the webbing slot 331 from the first side 301 of the adjuster base 30 to the second side 302 of the adjuster base 30.

With reference to FIGS. 4 to 7, 9, and 12, the webbing-abutting portion 32 is made of a plastic material and is formed to cover the upper section of the frame 31. The webbing-abutting portion 32 and the through hole 311 of the frame 31 form the sliding space 321 therebetween to provide a space for the first webbing section a to be mounted therethrough, and the first webbing section a is to abut the webbing-abutting portion 32. Preferably, the webbing-abutting portion 32 is formed by a wear-resistant plastic material. In the preferred embodiments, a bottom of the webbing-abutting portion 32 extends into a part of a top of the through hole 311. The sliding space 321 is defined between a bottom surface of the webbing-abutting portion 32 and a bottom edge of the base section 3111 of the through hole 311. An end of the webbing-abutting portion 32 near the sliding space 321 forms a webbing-abutting end 322 to abut the first webbing section a. Preferably, the webbing-abutting end 322 has multiple protruding teeth.

With reference to FIGS. 4 to 7, and 9, the webbing-mounting portion 33 is made of a plastic material and is formed to cover a lower section of the frame 31. The webbing-mounting portion 33 is connected to and covers the edge of the connecting hole 32 to form the webbing slot 331. With reference to FIGS. 11 and 12, the webbing slot 331 is configured for the second webbing section b to be mounted therethrough, and the second webbing section b is to abut the webbing-mounting portion 33. Preferably, the webbing-mounting portion 33 is formed by a wear-resistant plastic material. An upper wall and a lower wall of the webbing-mounting portion 33 adjacent to the webbing slot 331 are formed on a bottom of the webbing-mounting portion 33 and are both arc-shaped, which allows the second webbing section b to be smoothly mounted through the webbing slot 331 and abut the upper wall or the lower wall of the webbing-mounting portion 33 to be redirected toward another direction.

Figure 9:
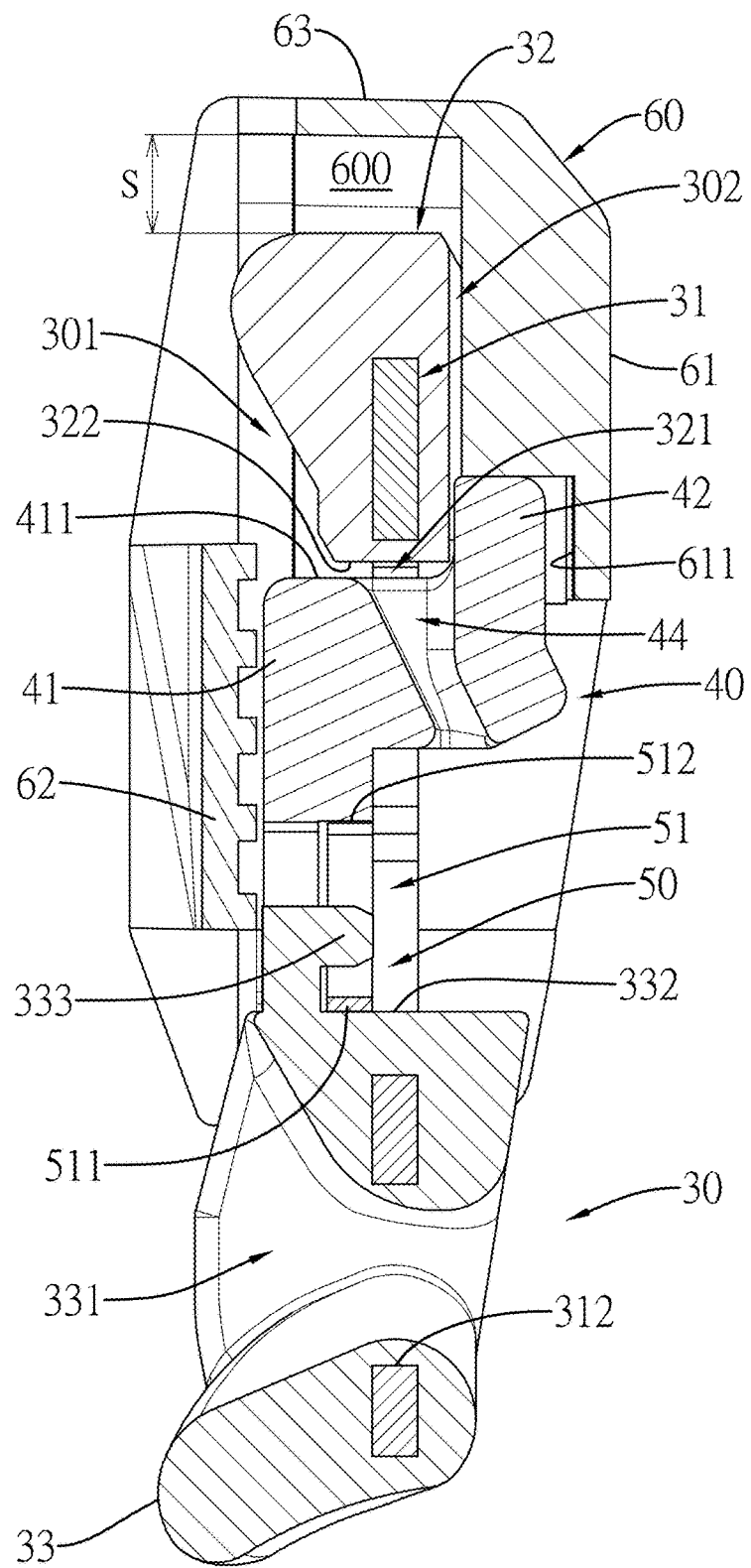
FIG. 9 is a sectional side view of the webbing height adjusting unit in FIGS. 1, 2, 4, and 5.

With reference to FIGS. 6, 7, and 9, in the first preferred embodiment, the webbing-mounting portion 33 has an abutting surface 332 formed on a top of the webbing-mounting portion 33 and extending to the extending section 3112 of the through hole 311. The webbing-mounting portion 33 has a position-limiting post 333 protruding from the abutting surface 332 and laterally extending toward the extending section 3112 of the through hole 311 of the frame 31 to form a gap between the position-limiting post 333 and the abutting surface 332.

With reference to FIGS. 4 to 7, 9, and 12, the slider 40 is mounted in the sliding space 321 of the adjuster base 30, configured to move up and down along the sliding space 321, and having an inclined slot 44. The inclined slot 44 provides a space for the first webbing section a to be mounted therethrough. The slider 40 and the webbing-abutting portion 32 of the adjuster base 30 are configured to clamp the first webbing section a together for positioning and are configured to move along the first webbing section a.

With reference to FIGS. 4 to 7, and 9, in the first preferred embodiment, the slider 40 has a first side board 41, a second side board 42, and two connecting portions 43. The first side board 41 and the second side board 42 are arranged at a spaced interval, and the two connecting portions 43 are located between and formed in one piece with the first side board 41 and the second side board 42. The inclined slot 44 obliquely extends between the two connecting portions 43 along a direction from an end of the first side board 41 near the webbing-abutting portion 32 toward a bottom of the second side board 42 near the webbing-mounting portion 33. When the slider 40 is mounted in the sliding space 321, the first side board 41 and the second side board 42 are located at the first side 301 and the second side 302 of the adjuster base 30, respectively. The two connecting portions 43 are located in the sliding space 321. The first side board 41 has a clamping surface 411 formed on a top of the first side board 41, and the clamping surface 411 and the webbing-abutting end 322 are configured to clamp the first webbing section a together.

Figure 5:
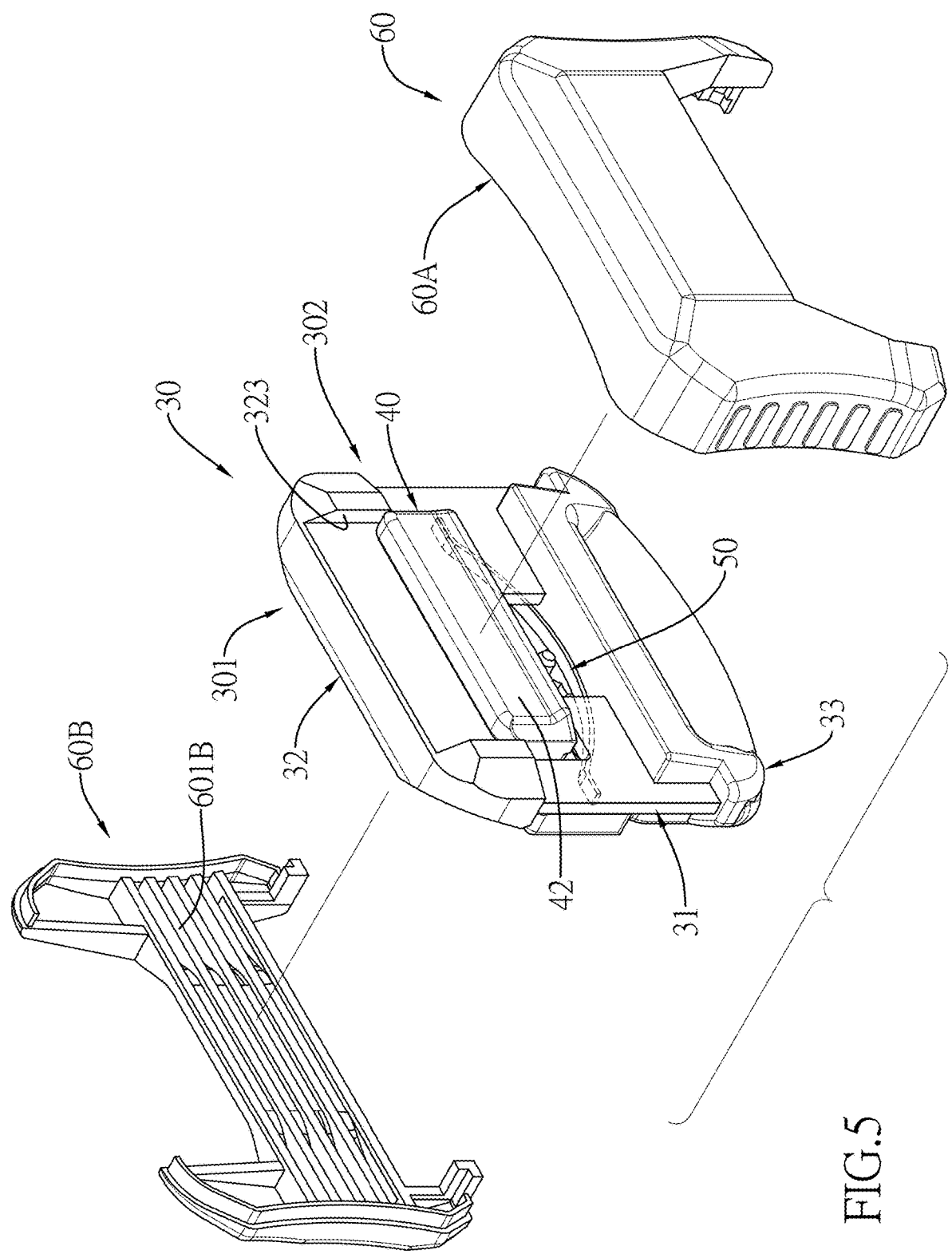
FIG. 5 is another exploded view of an outer shell of the webbing height adjusting unit in FIGS. 1 and 2.

With reference to FIG. 7, in the first preferred embodiment, a top end of the second side board 42 is located higher than a top end of the first side board 41 and a top opening of the inclined slot 44. The first side board 41 further has a mounting groove 412 formed on a bottom of the first side board 41 and extending upward. With reference to FIG. 5, the webbing-abutting portion 32 has a sliding groove 323 located on the second side 302 of the adjuster base 30, and the second side board 42 of the slider 40 is inserted into the sliding groove 323 and is configured to move upward and downward.

With reference to FIGS. 4, 5, 9, and 12, the elastic member 50 is disposed between the slider 40 and the adjuster base 30 to provide a restoring force such that the slider 40 and the webbing-abutting portion 32 of the adjuster base 30 are configured to clamp an object together. In the first preferred embodiment, the elastic member 50 is disposed between the slider 40 and the top of the webbing-mounting portion 33 to provide the restoring force for the slider 40 and the webbing-abutting portion 32 of the adjuster base 30 to clamp the first webbing section a for positioning. When the slider 40 and the adjuster base 30 move relative to each other (e.g. the slider 40 is operated to move downward relative to the adjuster base 30, or the adjuster base 30 is operated to move upward relative to the slider 40), the first webbing section a clamped by the slider 40 and the adjuster base 30 can be unclamped and released, and the elastic member 50 is compressed to store an elastic energy. Besides, when a tension of the first webbing section a increases, a clamping force between the slider 40 and the adjuster base 30 can be increased to clamp the first webbing section a more tightly.

In different embodiments, the elastic member 50 may adopt a spiral spring, a flat spring, or any other equivalent elastic component, and a number of said elastic member 50 may be increased as desired. With reference to FIGS. 4 to 7 and 9, in the first preferred embodiment, the elastic member 50 may adopt an arc-shaped flat spring 51. The arc-shaped flat spring 51 has a middle portion 511 and two end portions 512. The two end portions 512 extend upward in a curve from two opposite ends of the middle portion 511 respectively. The middle portion 511 abuts the abutting surface 332 of the webbing-mounting portion 33, and the position-limiting post 333 is located above the middle portion 511 to limit the middle portion 511 between the abutting surface 332 and the position-limiting post 333. The two end portions 512 of the arc-shaped flat spring 51 abut against a bottom of the first side board 41; specifically, the two end portions 512 of the arc-shaped flat spring 51 are inserted into the mounting groove 412 and abut two sides of a groove wall of the mounting groove 412 respectively. Thereby, forces applied on two opposite sides of the slider 40 respectively by the elastic member 50 can be equal, which allows the slider 40 and the adjuster base 30 to move smoothly.

With reference to FIGS. 1, 2, 9, and 12, the outer shell 60 is mounted to the adjuster base 30, is configured to move up and down, and is operable to allow the slider 40 and the adjuster base 30 to move relatively for unclamping the first webbing section a. When the outer shell 60 is released, the restoring force of the elastic member 50 drives the slider 40 and the adjuster base 30 to re-clamp the first webbing section a. In the first preferred embodiment, the outer shell 60 is mounted to an upper section of a periphery of the adjuster base 30, and the outer shell 60 can operate the slider 40 and the adjuster base 30 to unclamp the first webbing section a such that the webbing height adjusting unit 3 can move up and down along the first webbing section a and the second webbing section b to adjust its height position.

Figure 4:
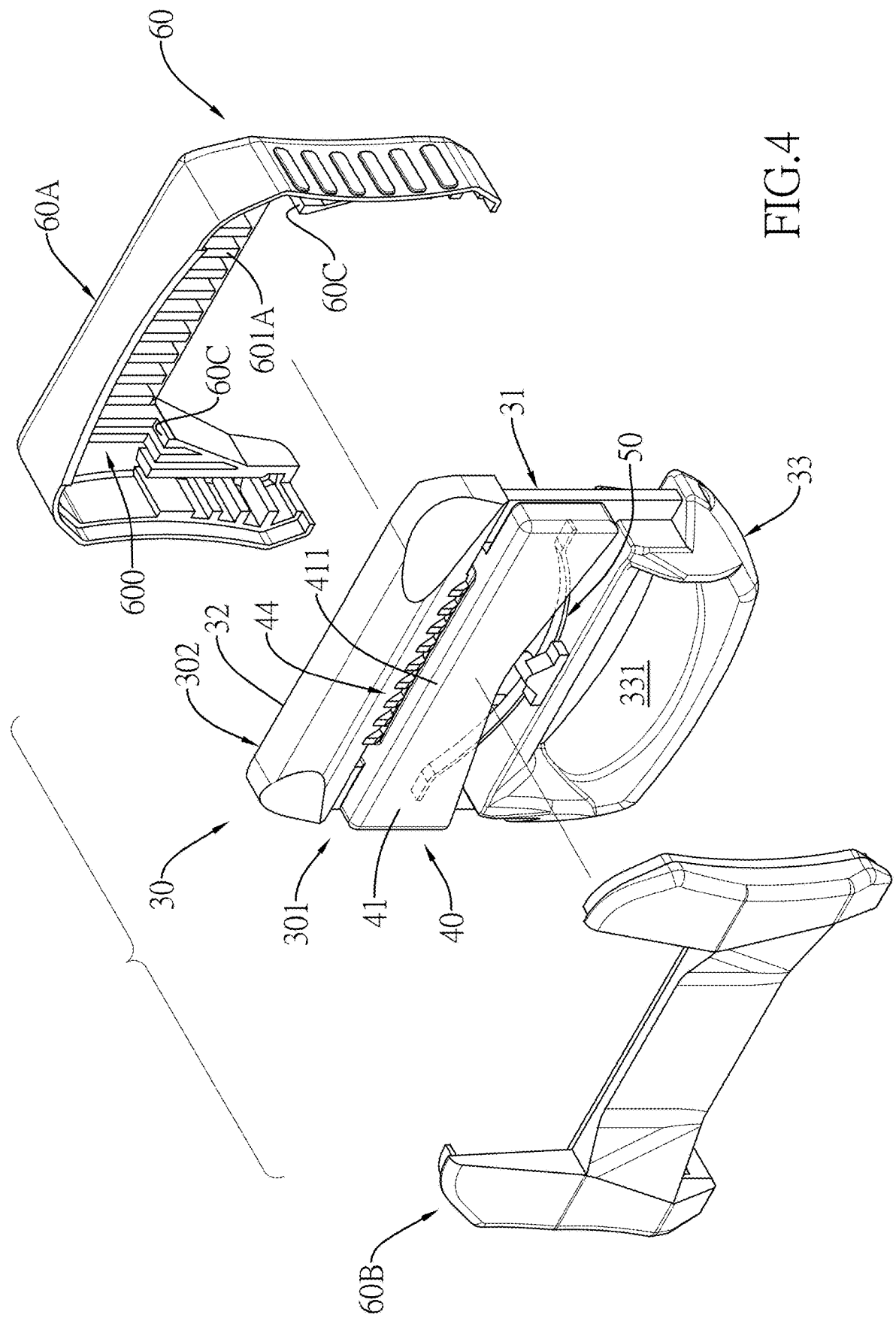
FIG. 4 is an exploded view of an outer shell of the webbing height adjusting unit in FIG. 1.

With reference to FIGS. 4 and 5, in the first preferred embodiment, the outer shell 60 has a shell base 60A and a shell cover 60B connected and fixed to each other. Both of the shell base 60A and the shell cover 60B have multiple ribs 601A/601B disposed on their internal surfaces so as to improve mechanical strength of the shell base 60A and the shell cover 60B.

Figure 10:
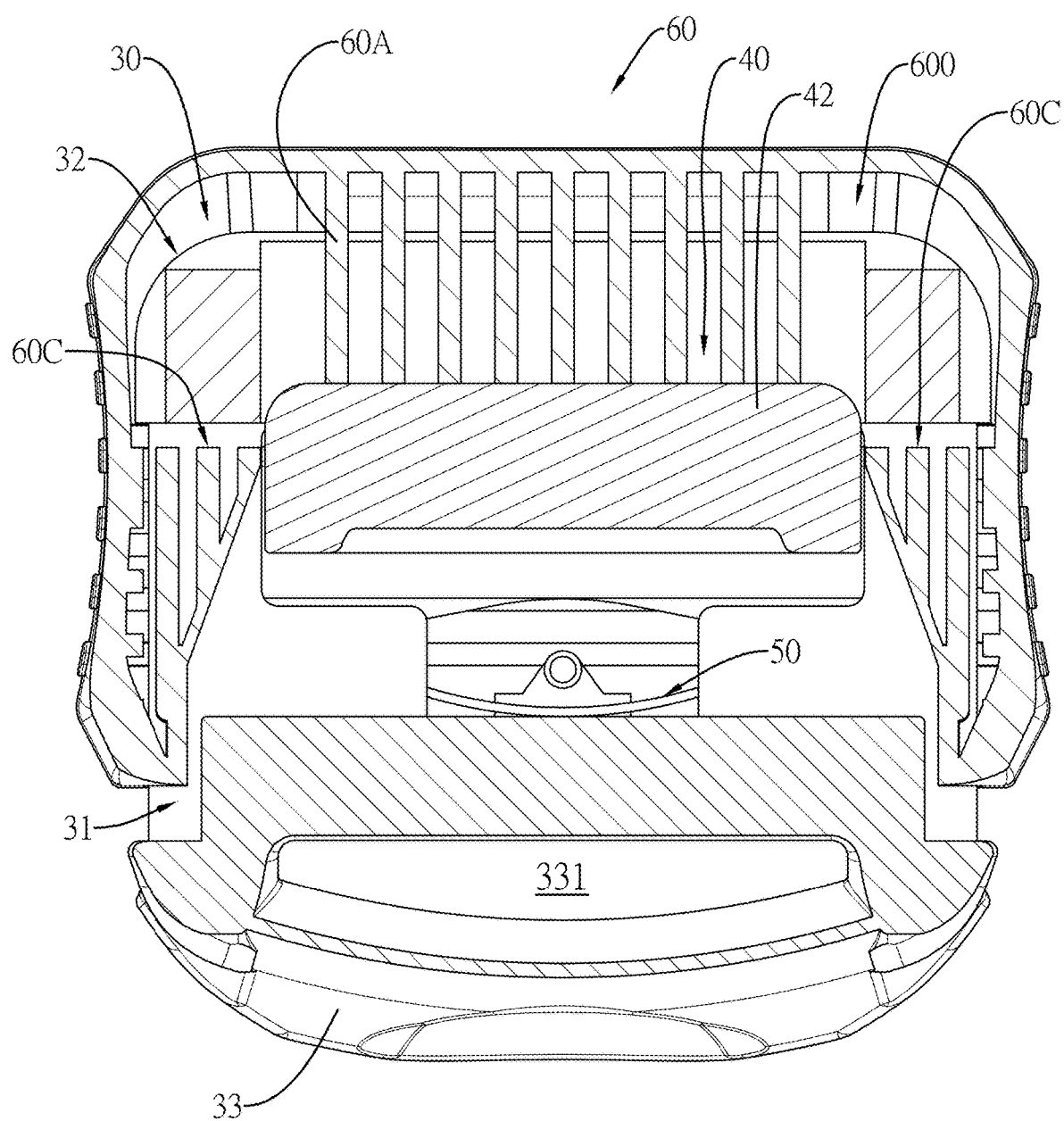
FIG. 10 is a sectional view of the webbing height adjusting unit across line 10-10 in FIG. 3.

With reference to FIGS. 4, 9, and 10, the outer shell 60 has an operation space 600 and two abutting portions 60C. The operation space 600 is formed on an upper section of an interior of the outer shell 60, and the two abutting portions 60C are located below two opposite sides of the operation space 600 respectively. The webbing-abutting portion 32 of the adjuster base 30 is configured to move up and down in the operation space 600, and the two abutting portions 60C are located below the webbing-abutting portion 32; thereby, when the outer shell 60 is pulled upward, the two abutting portions 60C push the webbing-abutting portion 32 such that the adjuster base 30 and the slider 40 move relative to each other; the outer shell 60 may also move downward to push the second side board 42 of the slider 40 such that the adjuster base 30 and the slider 40 move relative to each other.

With reference to FIGS. 1 to 3, 6, 7, and 9, in the preferred embodiments, the outer shell 60 has a first plate portion 61, a second plate portion 62, and a top side wall 63. The first plate portion 61 is located beside the second side board 42 of the slider 40 (i.e. the second side 302 of the adjuster base 30) and is configured to abut a top of the second side board 42. The second plate portion 62 is disposed beside the first side board 41 of the slider 40 (i.e. the first side 301 of the adjuster base 30). The top side wall 63 is connected to a top of the first plate portion 61, and the outer shell 60 has a webbing-mounting space defined between the top side wall 63 and a top of the second plate portion 62. The top side wall 63 is located above the webbing-abutting portion 32. With reference to FIGS. 9 to 12, the first webbing section a is sequentially mounted through the webbing-mounting space between the top side wall 63 and the second plate portion 62, the sliding space 321 of the adjuster base 30, and the inclined slot 44 of the slider 40 from a position above one of two opposite sides of the outer shell 60, and then extends downward from the other one of the two opposite sides of the outer shell 60. The first webbing section a is clamped by the slider 40 and the adjuster base 30 under the restoring force of the elastic member 50. The second webbing section b is mounted through the webbing slot 331 of the webbing-mounting portion 33 from one of two sides of the outer shell 60 on the second plate portion 62 and extends downward from the other one of the two sides of the outer shell 60.

With reference to FIGS. 12, 9, and 10, when the slider 40 and the adjuster base 30 clamp the first webbing section a, the outer shell 60 descends naturally and abuts the top of the second side board 42 of the slider 40 pushed upward by the elastic member 50. An operation gap S is formed between a bottom surface of the top side wall 63 of the outer shell 60 (i.e. a side surface of the top side wall 63 facing the operation space 600) and a top of the webbing-abutting portion 32 of the adjuster base 30; thereby, when the outer shell 60 is operated to push the slider 40 downward, the slider 40 and the adjuster base 30 are configured to be relatively moved a distance equal to the operation gap S, and the bottom surface of the top side wall 63 abuts the top of the webbing-abutting portion 32 to limit the relative movement of the slider 40 and the adjuster base 30, which prevents the elastic member 50 from deformation under overloading and maintains the elasticity of the elastic member 50 between the slider 40 and the adjuster base 30. Additionally, when the webbing-abutting portion 32 of the adjuster base 30 moves up and down in the operation space 600 of the outer shell 60, the two abutting portions 60C located below the webbing-abutting portion 32 limit the position of the webbing-abutting portion 32 and prevent the adjuster base 30 and the outer shell from being detached from each other.

Figure 2:
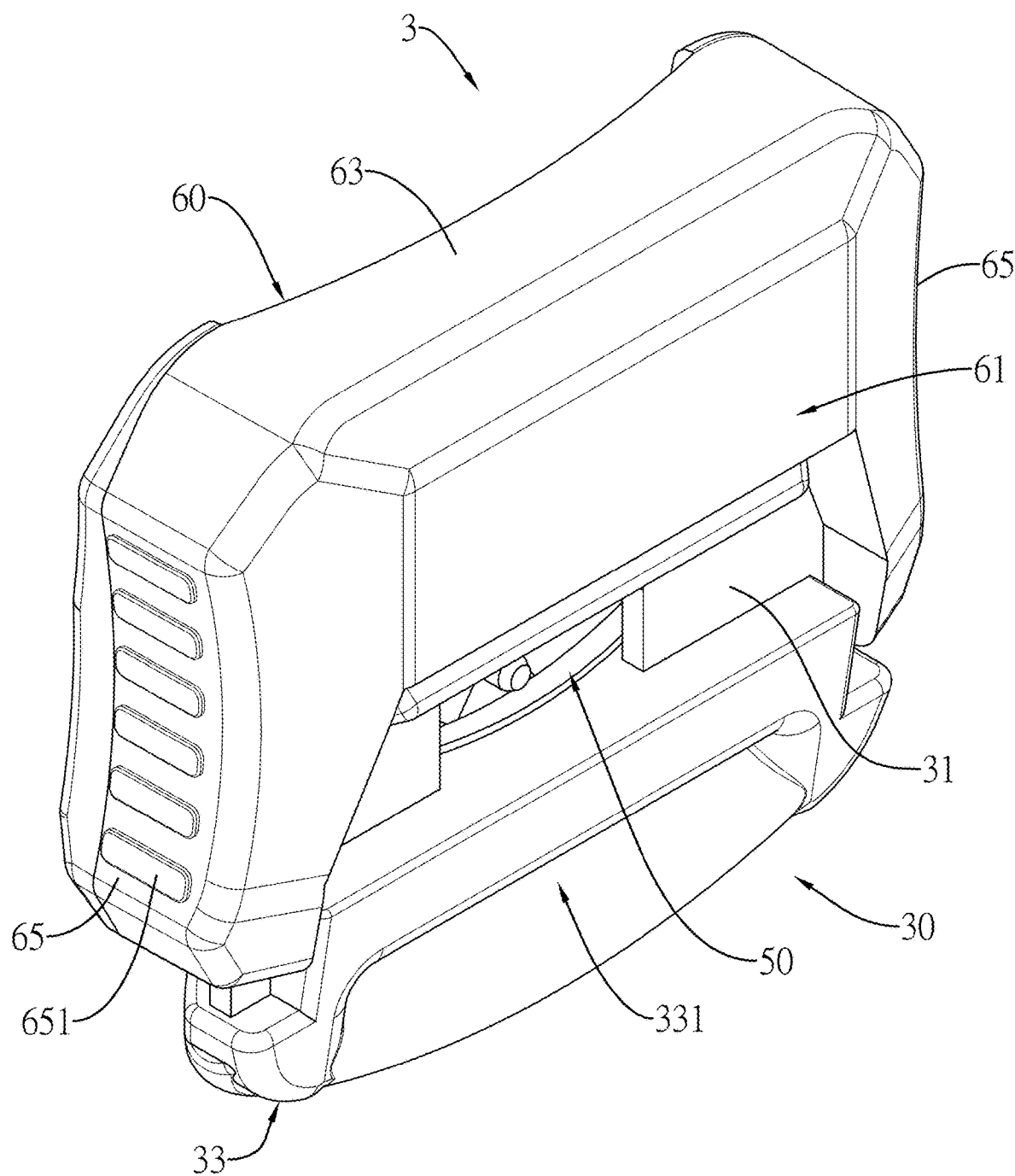
FIG. 2 is another perspective view of the webbing height adjusting unit in FIG. 1.
Figure 3:
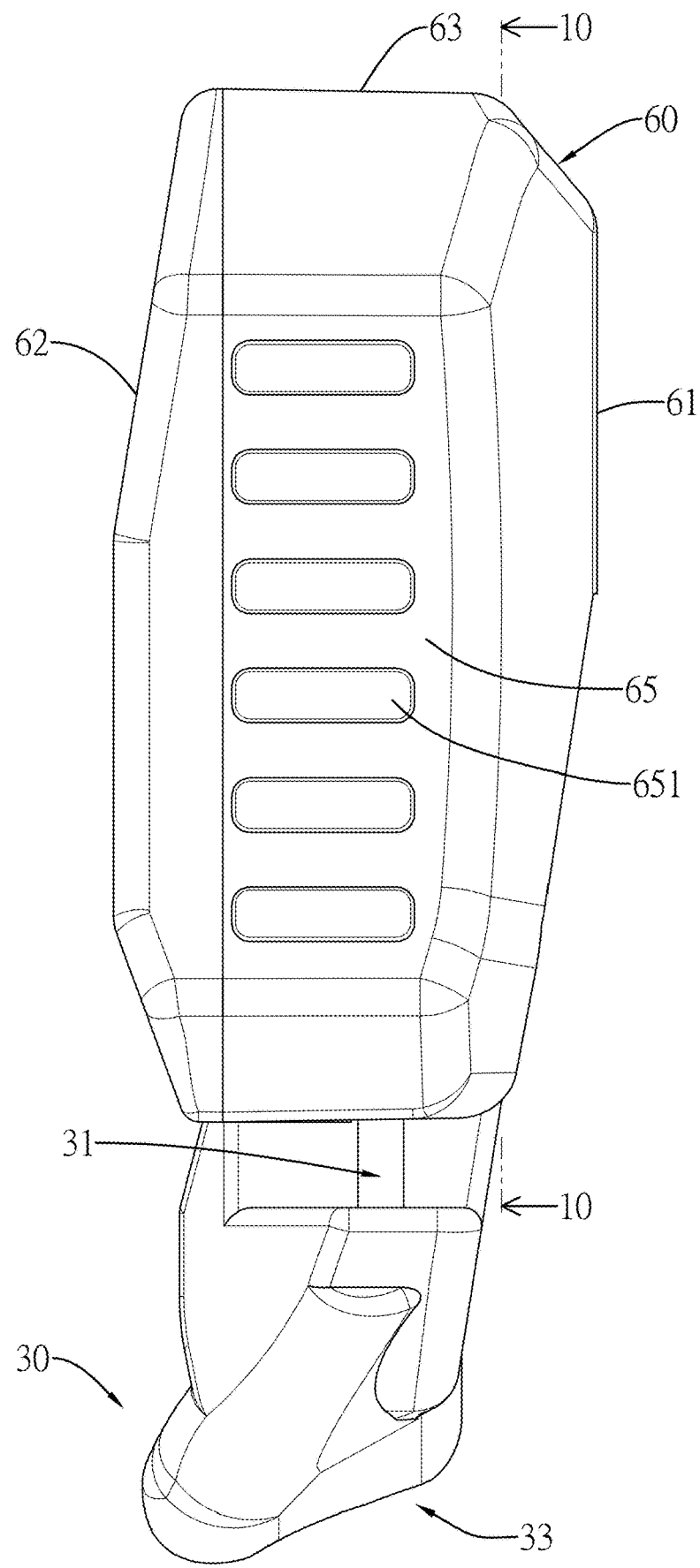
FIG. 3 is a side view of the webbing height adjusting unit in FIG. 1.

With reference to FIGS. 1 and 2, in the first preferred embodiment, the outer shell 60 has two side walls 65 located on two opposite sides of the first plate portion 61 and the top side wall 63 respectively. Each one of the two side walls 65 has a slip-proof surface 651 formed on its periphery, which is convenient for an occupant to hold the outer shell 60 and operate the slider 40 and the adjuster base 30 to move relatively.

With reference to FIG. 9, in the first preferred embodiment, the outer shell 60 further has a receiving groove 611 formed on a bottom of the first plate portion 61. The second side board 42 of the slider 40 is inserted into the receiving groove 611 of the first plate portion 61, which ensures the outer shell 60 directly drives the slider 40.

With reference to FIGS. 13 to 16, in a second preferred embodiment of the webbing height adjusting unit 3 in accordance with the present invention, the outer shell 60 further has a bridge portion 66 connected to the second plate portion. A space is formed between the bridge portion 66 and the second plate portion 62, and the second webbing section b is located through the space between the bridge portion 66 and the second plate portion 62 and mounted through the webbing slot 331 of the adjuster base 30. The bridge portion 66 is utilized to guide the direction of the second webbing section b near the webbing height adjusting unit 3.

By the configurations mentioned above, the webbing height adjusting unit 3 of the present invention is configured to be disposed inside the vehicle, be connected to the three-point seat belt system, and be connected to the first webbing section a and the second webbing section b located above a side of the seat and below a D-loop respectively. The webbing height adjusting unit 3 is configured to form an adjustable top position. In the preferred embodiment, the first webbing section a and the second webbing section b are a section of two different webbings respectively (e.g. a front section of a main webbing abutting the shoulder and a section of a supplementary webbing in the three-point seat belt system).

Operation of the webbing height adjusting unit 3 applied in the three-point seat belt system is basically the same as operation of a webbing height adjusting device of the present invention applied in the three-point seat belt system and is described below after description of configurations of the webbing height adjusting device.

Figure 17:
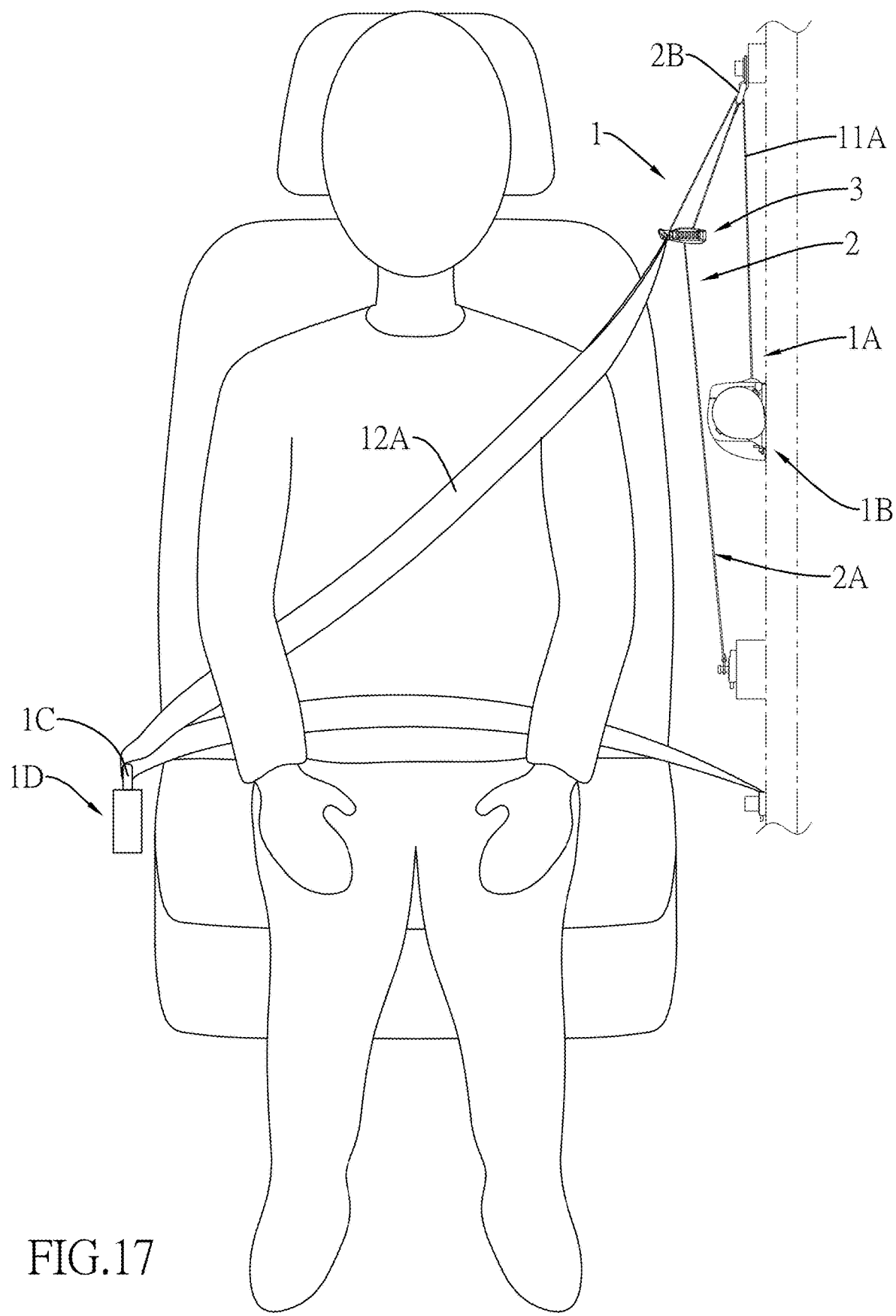
FIG. 17 depicts the webbing height adjusting unit in FIG. 1 applied in a three-point seat belt system.

With reference to FIG. 17, the webbing height adjusting device of the present invention is applied in a seat belt system in the vehicle, wherein the seat belt system is basically the three-point seat belt system 1. The three-point seat belt system 1 has a webbing retractor 1B and a main webbing 1A. The webbing retractor 1B is located on a side of the seat near a vehicle pillar in the vehicle, and the main webbing 1A is a strip-shaped component extending from the webbing retractor 1B and being flexible but unable to deform elastically. The webbing retractor 1B is configured to automatically retract the main webbing 1A therein. An end of the main webbing 1A away from the webbing retractor 1B is fixed on a side of the seat or a bottom of the vehicle pillar. The seat belt system has a tongue 1C attached to the main webbing 1A and configured to be detachably inserted into a buckle 1D of the seat belt system located on the other side of the seat (i.e., the side located away from the vehicle pillar). The seat belt system is conventional, and thus other specific configurations thereof are omitted from description.

With reference to FIG. 17, the webbing height adjusting device of the present invention has a supplementary webbing component 2 and the webbing height adjusting unit 3 mentioned above. Specific configurations of the supplementary webbing component 2 and the webbing height adjusting unit 3 are described below.

With reference to FIG. 17, the supplementary webbing component 2 is disposed beside the seat and near the vehicle pillar in the vehicle. The supplementary webbing component 2 has a supplementary webbing 2A and a D-loop 2B connected to a top end of the supplementary webbing 2A; the D-loop 2B and a bottom end of the supplementary webbing 2A are connected to an upper position and a lower position in the vehicle respectively. The D-loop 2B is located at an upper position on the vehicle pillar. The main webbing 1A is mounted through the D-loop 2B to have two webbing sections divided by the D-loop 2B. The supplementary webbing 2A is located between the two webbing sections of the main webbing 1A.

Further, with reference to FIG. 17, when the occupant on the seat fastens the main webbing 1A, the main webbing 1A is obliquely placed in front of the occupant's shoulder and chest, the tongue 1C is inserted into a buckle 1D, and a section of the main webbing 1A extends from the tongue 1C to the side of the seat near the webbing retractor 1B (i.e. the side near the vehicle pillar) and is laterally placed in front of the pelvis of the occupant; the three-point seat belt system 1 is mainly composed of the configurations mentioned above and is configured to secure the occupant's body on the seat. One of the two webbing sections of the main webbing 1A between the webbing retractor 1B and the D-loop 2B is defined as a rear section 11A, and the other one of the two webbing sections of the main webbing 1A obliquely placed in front of the occupant's shoulder and chest is defined as a front section 12A. The rear section 11A and the front section 12A are on two sides of the D-loop 2B respectively, and the supplementary webbing 2A is located between the rear section 11A and the front section 12A.

Configurations of the webbing height adjusting unit 3 are already described above; with reference to FIGS. 17 and 18, the webbing height adjusting unit 3 of the three-point seat belt system 1 is connected to the front section 12A of the main webbing 1A and the supplementary webbing 2A and forms an adjustable top position above a side of the seat being adjustable. The front section 12A of the main webbing 1A is mounted through the webbing-mounting portion 33 and the webbing slot 331 from the first side 301 to the second side 302 of the adjuster base 30. The supplementary webbing 2A is mounted through the sliding space 321 between the webbing-abutting portion 32 and the frame 31 and mounted through the inclined slot 44 of the slider 40 from the first side 301 to the second side 302. By the elastic member 50 providing the restoring force between the slider 40 and the adjuster base 30, the slider 40 and the webbing-abutting portion 32 of the adjuster base 30 are configured to clamp the supplementary webbing 2A together such that the webbing height adjusting unit 3 can be fixed on the supplementary webbing 2A. The outer shell 60 of the webbing height adjusting unit 3 is operable to drive the slider 40 and the adjuster base 30 to move relatively so as to unclamp the supplementary webbing 2A, which allows the webbing height adjusting unit 3 to adjust its height position. When the outer shell 60 is released, the restoring force of the elastic member 50 drives the slider 40 and the adjuster base 30 to re-clamp the supplementary webbing 2A.

Figure 18:
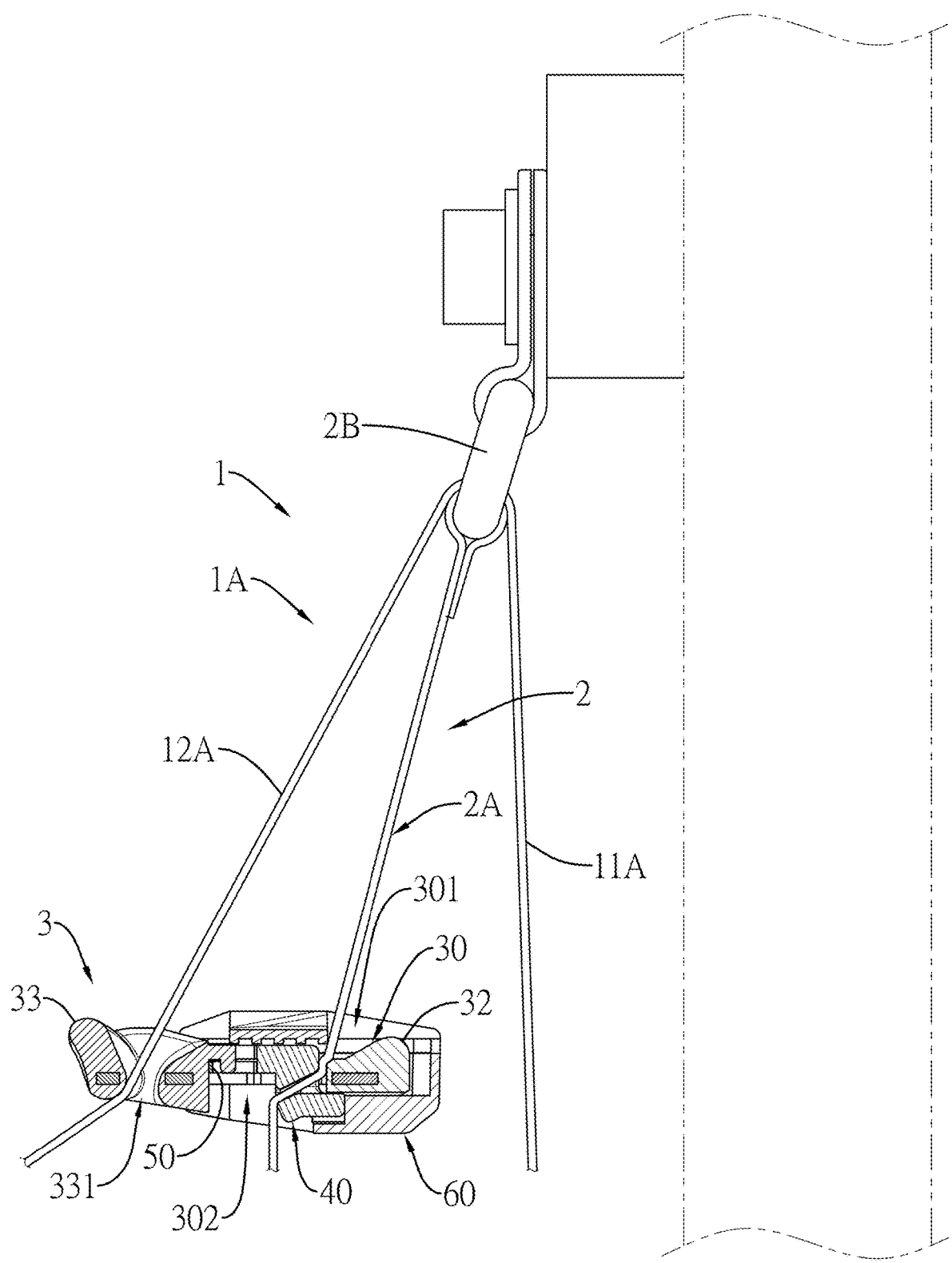
FIG. 18 is an operational view of the webbing height adjusting unit clamping a supplementary webbing in the three-point seat belt system in FIG. 17.
Figure 19:
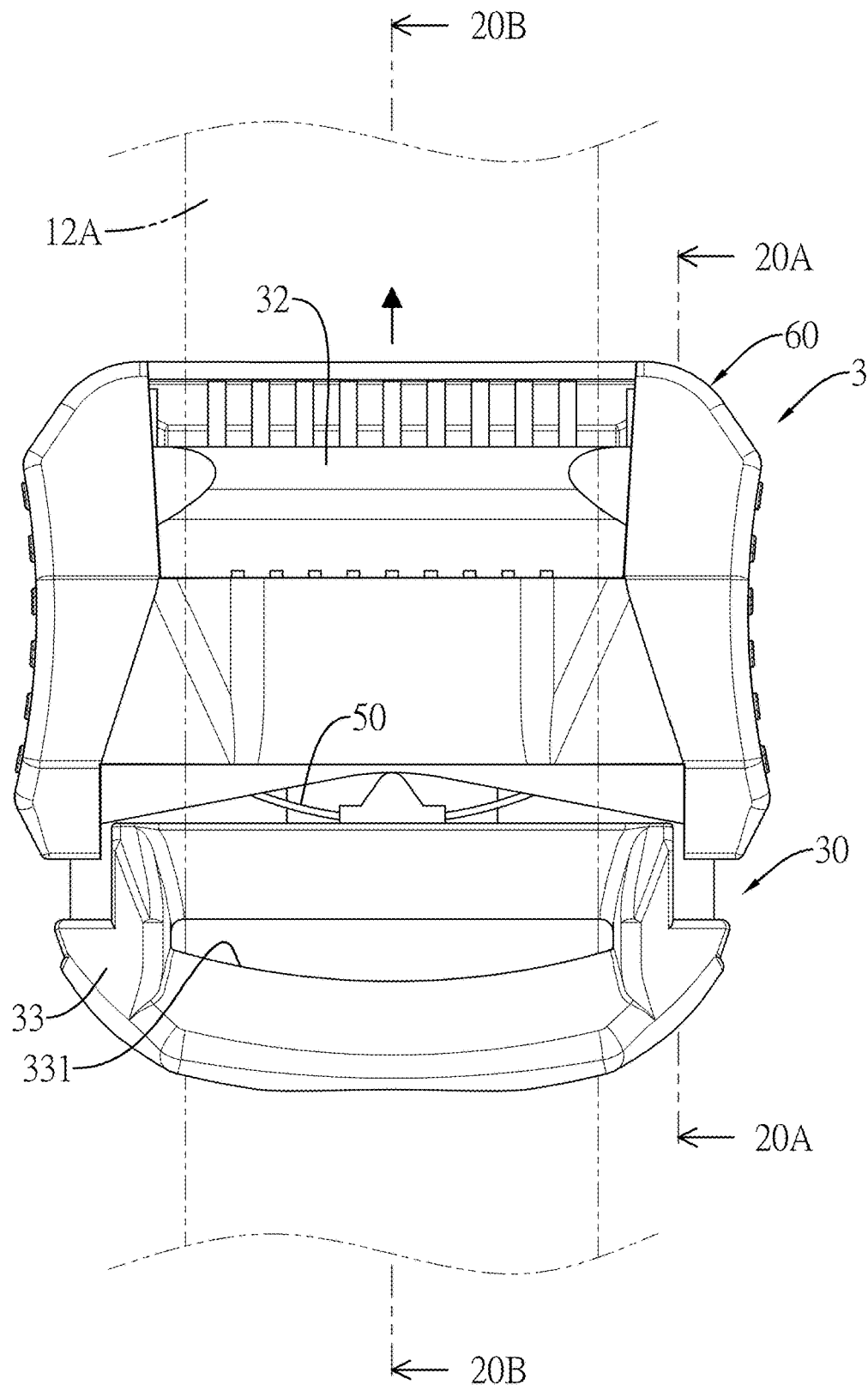
FIG. 19 is an operational view of adjusting a height position of the webbing height adjusting unit upward in the three-point seat belt system in FIGS. 17 and 18.
Figure 20A:
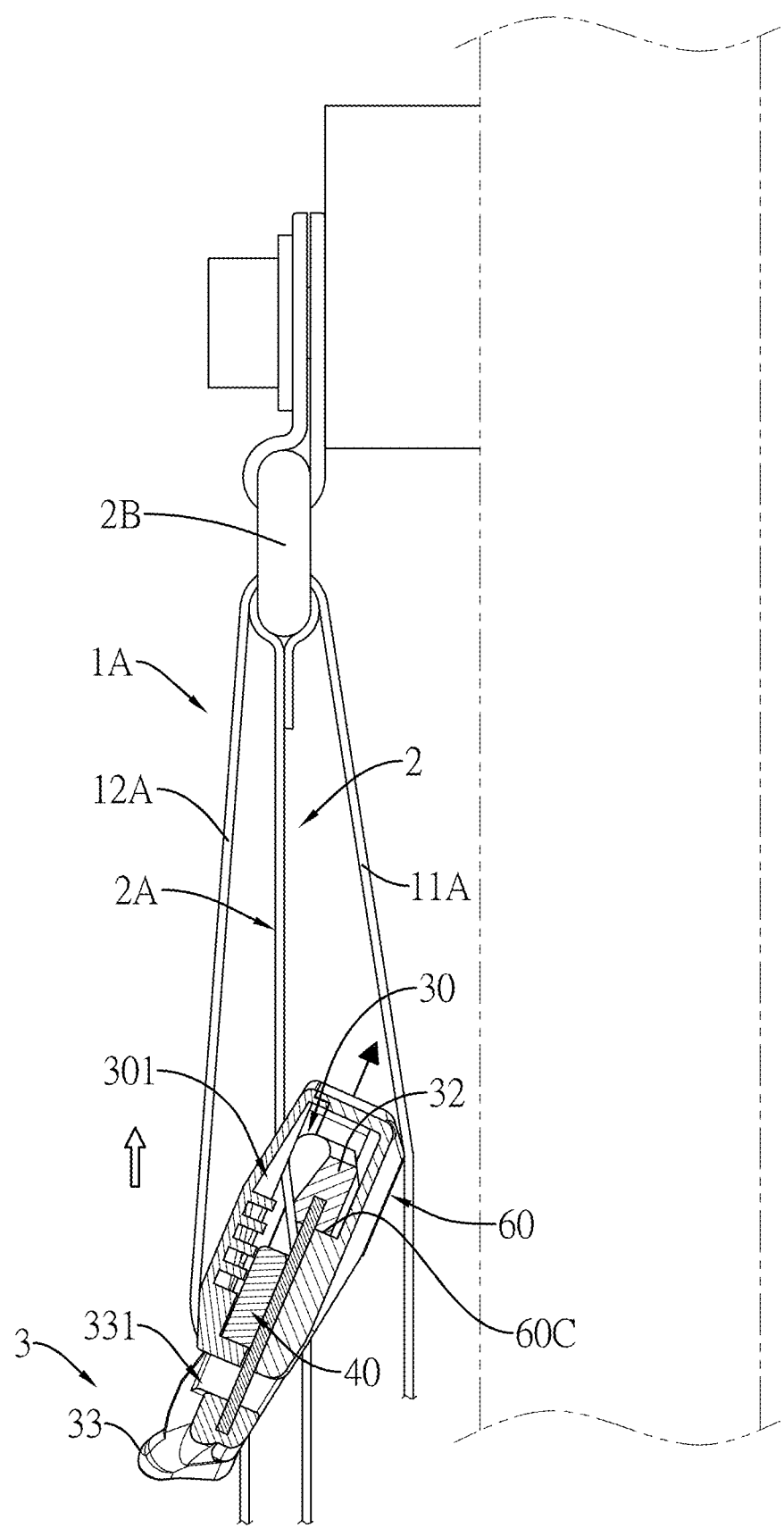
FIG. 20A is an operational sectional side view of the webbing height adjusting unit in the three-point seat belt system across line 20A-20A in FIG. 19.
Figure 20B:
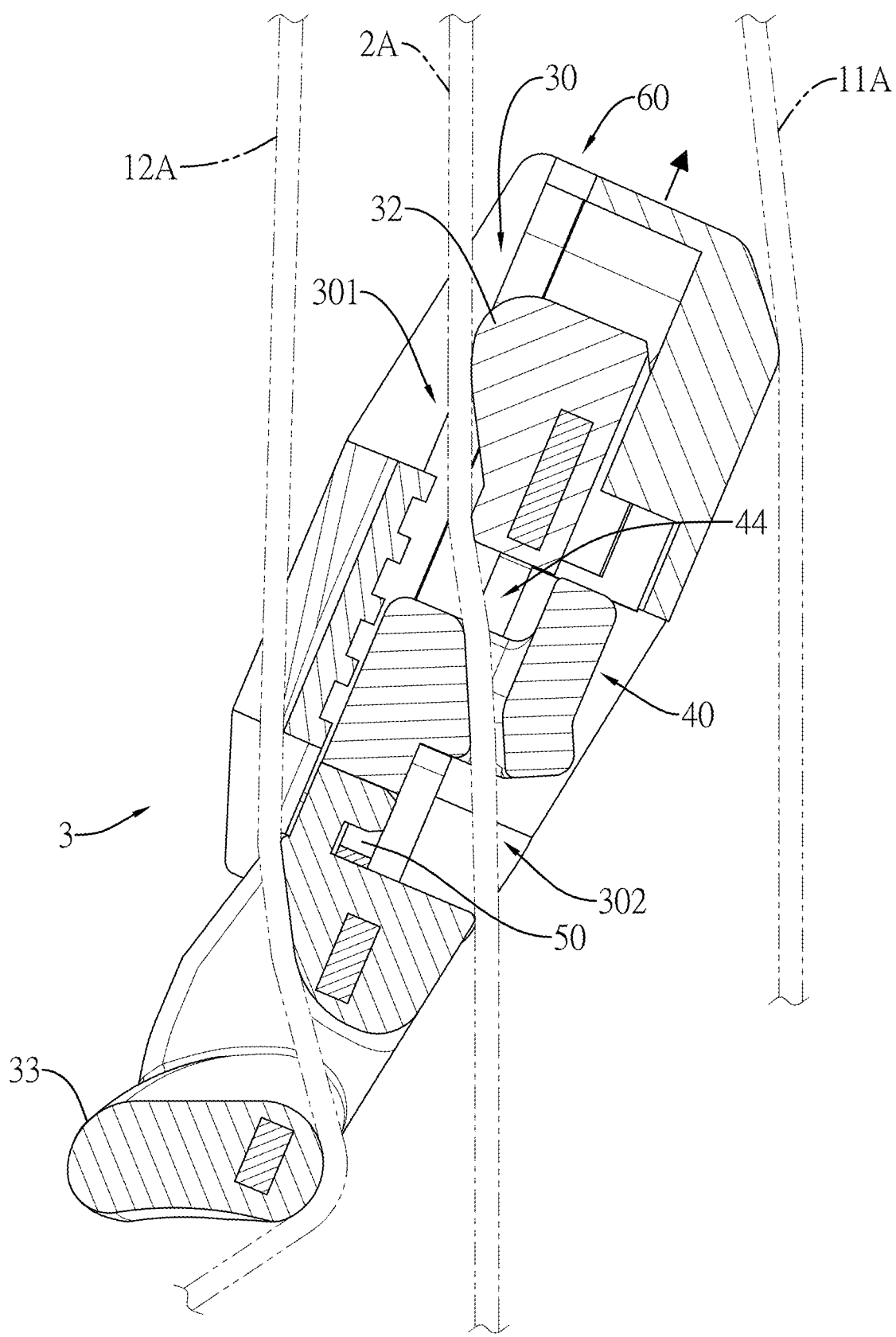
FIG. 20B is an operational sectional side view of the webbing height adjusting unit in the three-point seat belt system across line 20B-20B in FIG. 19.

With reference to FIGS. 17 and 18, when the occupant on the seat fastens the main webbing 1A correctly, the main webbing 1A extending from the webbing retractor 1B is movably mounted through the webbing height adjusting unit 3 and thus maintains its securing effect on the occupant. The webbing height adjusting unit 3 is located below the D-loop 2B and above a side of the occupant on the seat to form the adjustable top position. By the webbing height adjusting unit 3 fixed on the supplementary webbing 2A for the front section 12A of the main webbing 1A to be movably mounted therethrough, the front section 12A of the main webbing 1A is configured to be redirected by the bottom of the webbing-mounting portion 33; thereby, positions of the front section 12A of the main webbing 1A obliquely securing the occupant can be changed, which reduces discomfort of the occupant restricted by the main webbing 1A.

Operation of the occupant adjusting a height of the webbing height adjusting unit 3 connected to the supplementary webbing 2A and the front section 12A of the main webbing 1A (i.e. the height of the top position) is shown in FIGS. 17 and 18. Normally, the adjuster base 30 and the slider 40 are driven by the restoring force of the elastic member 50 to clamp the supplementary webbing 2A, and a tension of the front section 12 of the main webbing 1A mounted through the webbing slot 331 acts on the adjuster base 30. With reference to FIGS. 18, 19, 20A, 20B, when trying to adjust the webbing height adjusting unit 3 higher, the occupant holds and moves the outer shell 60 to push the adjuster base 30 upward (specifically, the two abutting portions 60C abut and push the webbing-abutting portion 32) such that the adjuster base 30 moves relatively to the slider 40 to unclamp the supplementary webbing 2A, which allows the height position of the webbing height adjusting unit 3 to be adjusted along the supplementary webbing 2A and the front section 12A of the main webbing 1A. After adjusting the webbing height adjusting unit 3 to a proper height position, the occupant releases the outer shell 60, and the restoring force of the elastic member 50 pushes the adjuster base 30 and the slider 40 to re-clamp the supplementary webbing 2A, which fixes the webbing height adjusting unit 3 at the proper height position. The webbing height adjusting unit 3 is thus convenient and easy in operation for the occupant.

Figure 21:
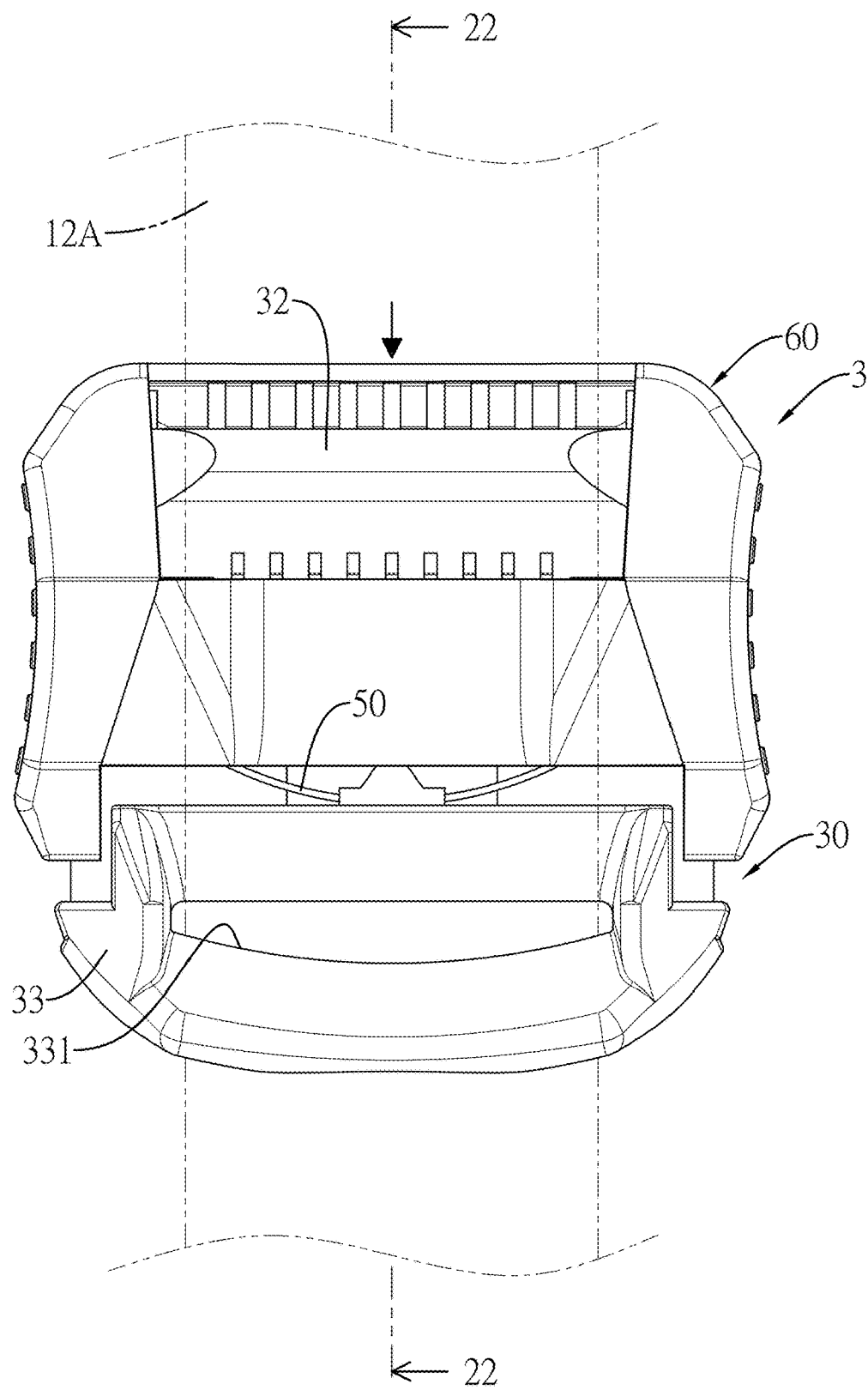
FIG. 21 is an operational view of adjusting the height position of the webbing height adjusting unit downward in the three-point seat belt system in FIG. 18.
Figure 22:
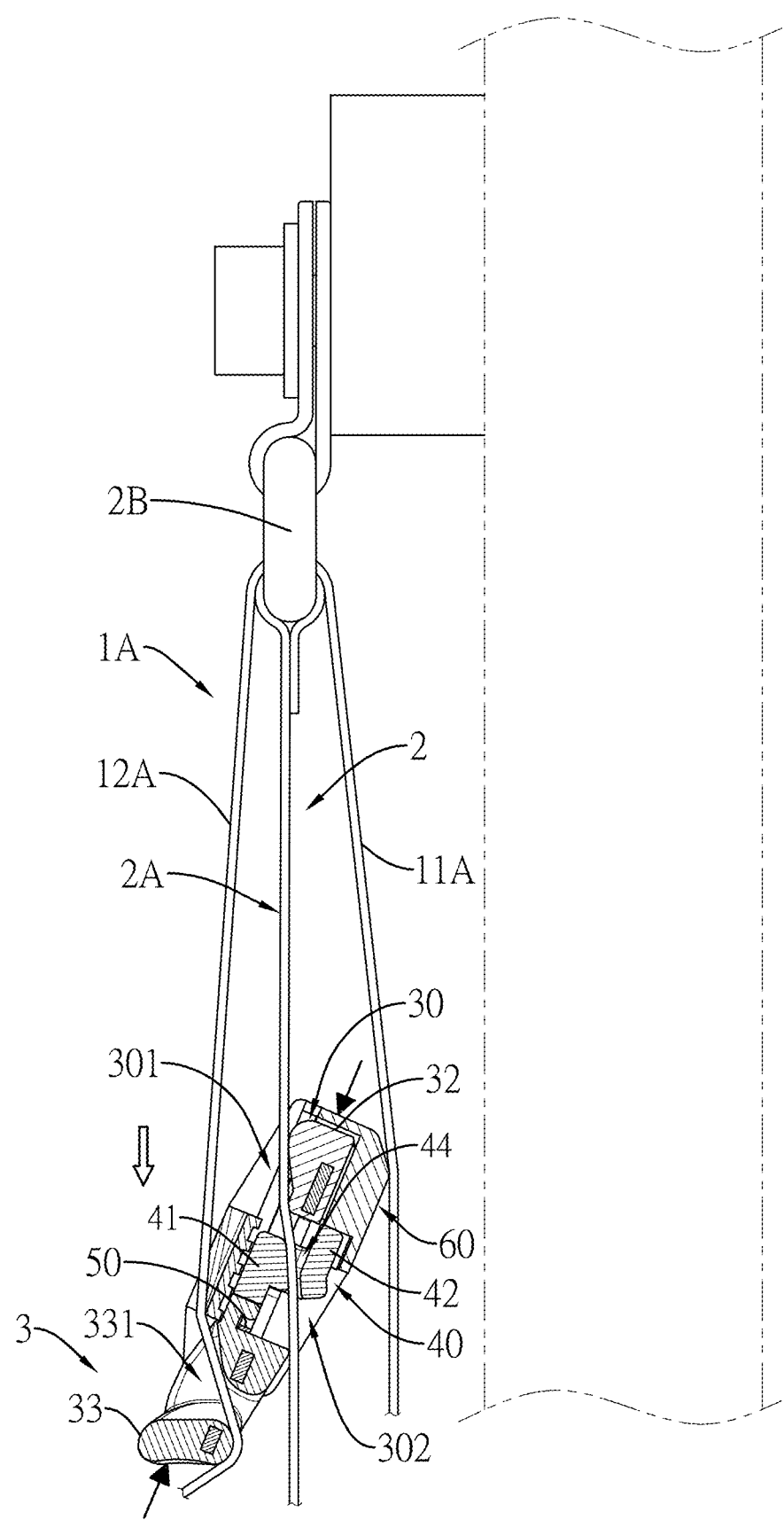
FIG. 22 is an operational sectional side view of the webbing height adjusting unit in the three-point seat belt system across line 22-22 in FIG. 21.
Figure 23:
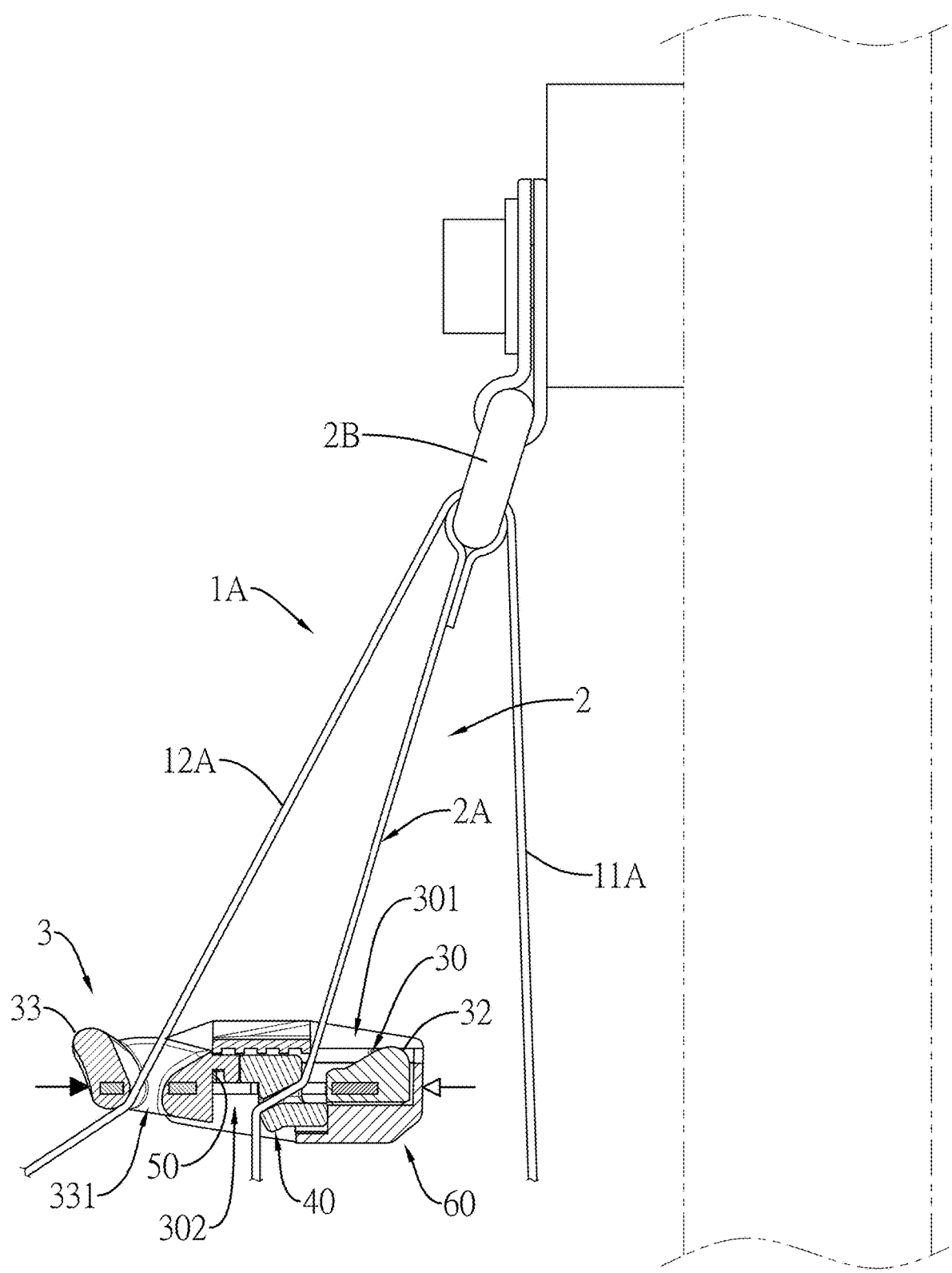
FIGS. 23 to 25 depict different ways of compressing the webbing height adjusting unit in the three-point seat belt system in FIGS. 17 and 18 to adjust the height position of the webbing height adjusting unit.
Figure 24:
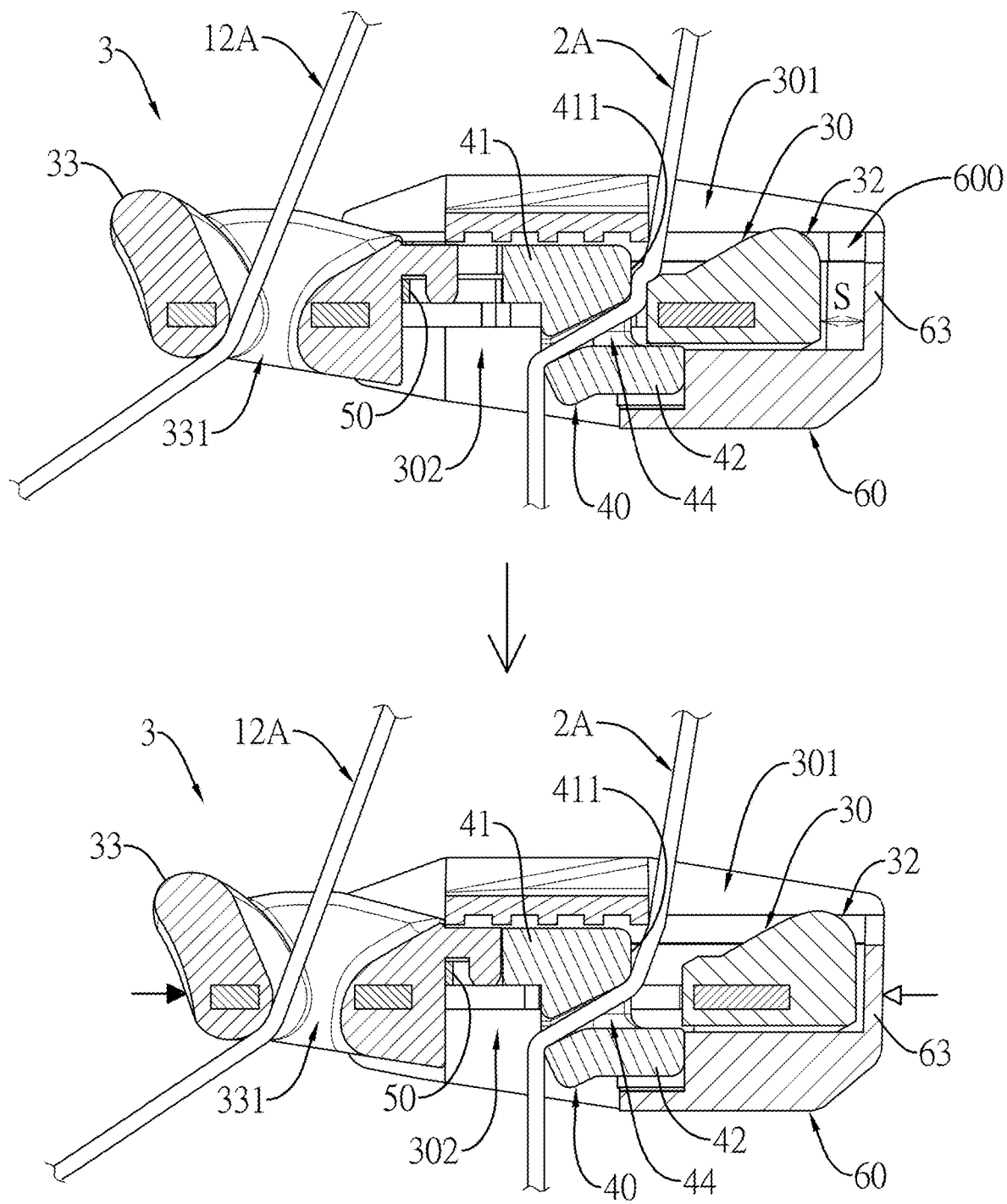
Figure 25:
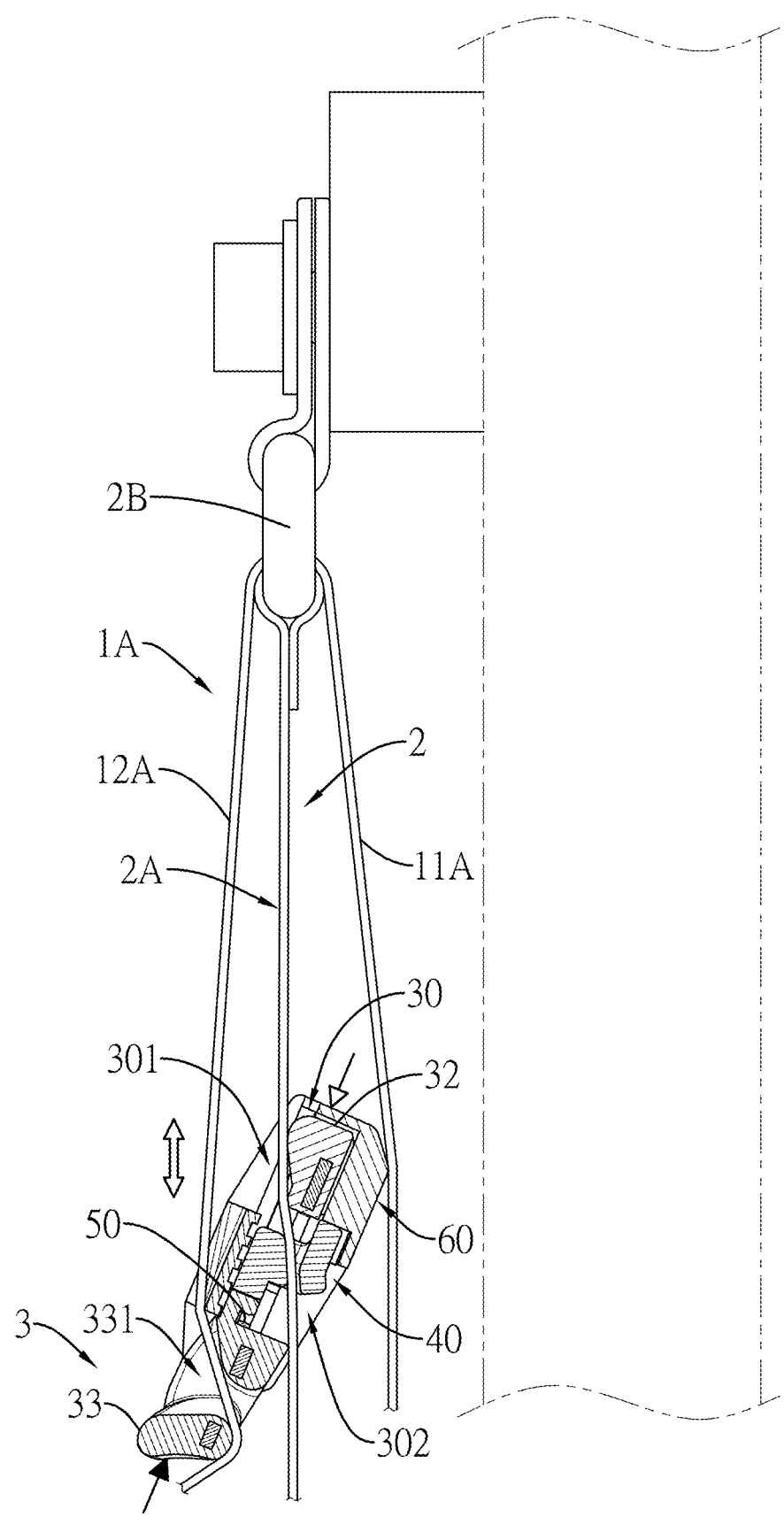

With reference to FIGS. 18, 21, 22, when trying to adjust the webbing height adjusting unit 3 lower, the occupant holds and moves the outer shell 60 to push the slider 40 downward (specifically, the outer shell 60 abuts and pushes the second side board 42 of the slider 40) such that the slider 40 moves relatively to the adjuster base 30 to unclamp the supplementary webbing 2A, which allows the height position of the webbing height adjusting unit 3 to be adjusted along the supplementary webbing 2A and the front section 12A of the main webbing 1A. After adjusting the webbing height adjusting unit 3 to a proper height position, the occupant releases the outer shell 60, and the restoring force of the elastic member 50 pushes the slider 40 and the adjuster base 30 to re-clamp the supplementary webbing 2A, which fixes the webbing height adjusting unit 3 at the proper height position.

With reference to FIGS. 18 and 23 to 25, the height position of the webbing height adjusting unit 3 can be adjusted by other operating methods; e.g., when trying to adjust the webbing height adjusting unit 3 higher or lower, the occupant can also hold the webbing height adjusting unit 3 and press the outer shell 60 and the adjuster base 30 at the same time such that the slider 40 and the adjuster base 30 move relatively to unclamp the supplementary webbing 2A, which allows the occupant to hold and adjust the webbing height adjusting unit 3 downward or upward along the supplementary webbing 2A and the front section 12A of the main webbing 1A easily. After adjusting the webbing height adjusting unit 3 to a proper height position, the webbing height adjusting unit 3 is released, and the restoring force of the elastic member 50 pushes the slider 40 and the adjuster base 30 to re-clamp the supplementary webbing 2A to fix the webbing height adjusting unit 3 at the proper height position.

With reference to FIGS. 17 and 18, when the occupant on the seat fastens the main webbing 1A correctly, the supplementary webbing 2A between the rear section 11A and the front section 12A of the main webbing 1A is mounted through a middle of the webbing-abutting portion 32 and the slider 40 from the first side 301 to the second side 302 of the adjuster base 30, and the elastic member 50 pushes the slider 40 and the webbing-abutting portion 32 to clamp the supplementary webbing 2A. The front section 12A of the main webbing 1A is movably mounted through the webbing slot 331 from the first side 301 to the second side 302 of the adjuster base 30, is redirected by the webbing-mounting portion 33, and then secures the occupant's body on the seat. A retracting force of the webbing retractor 1B acted on the main webbing 1A may increase the tension of the main webbing 1A, and the main webbing 1A may thus increase a tension of the supplementary webbing 2A via the webbing height adjusting unit 3. On the basis that the webbing height adjusting unit 3 initiatively clamps the supplementary webbing 2A, as the tension of the supplementary webbing 2A increases, the clamping force acted on the supplementary webbing 2A by the adjuster base 30 and the slider 40 can thus be improved to provide a better positioning effect and to maintain the webbing height adjusting unit 3 at the proper height position after adjustment. In other words, the clamping force is in a positive correlation with the tension on the main webbing 1A and minimizes the possibility of changing the location of the webbing height adjusting unit 3.

Figure 26:
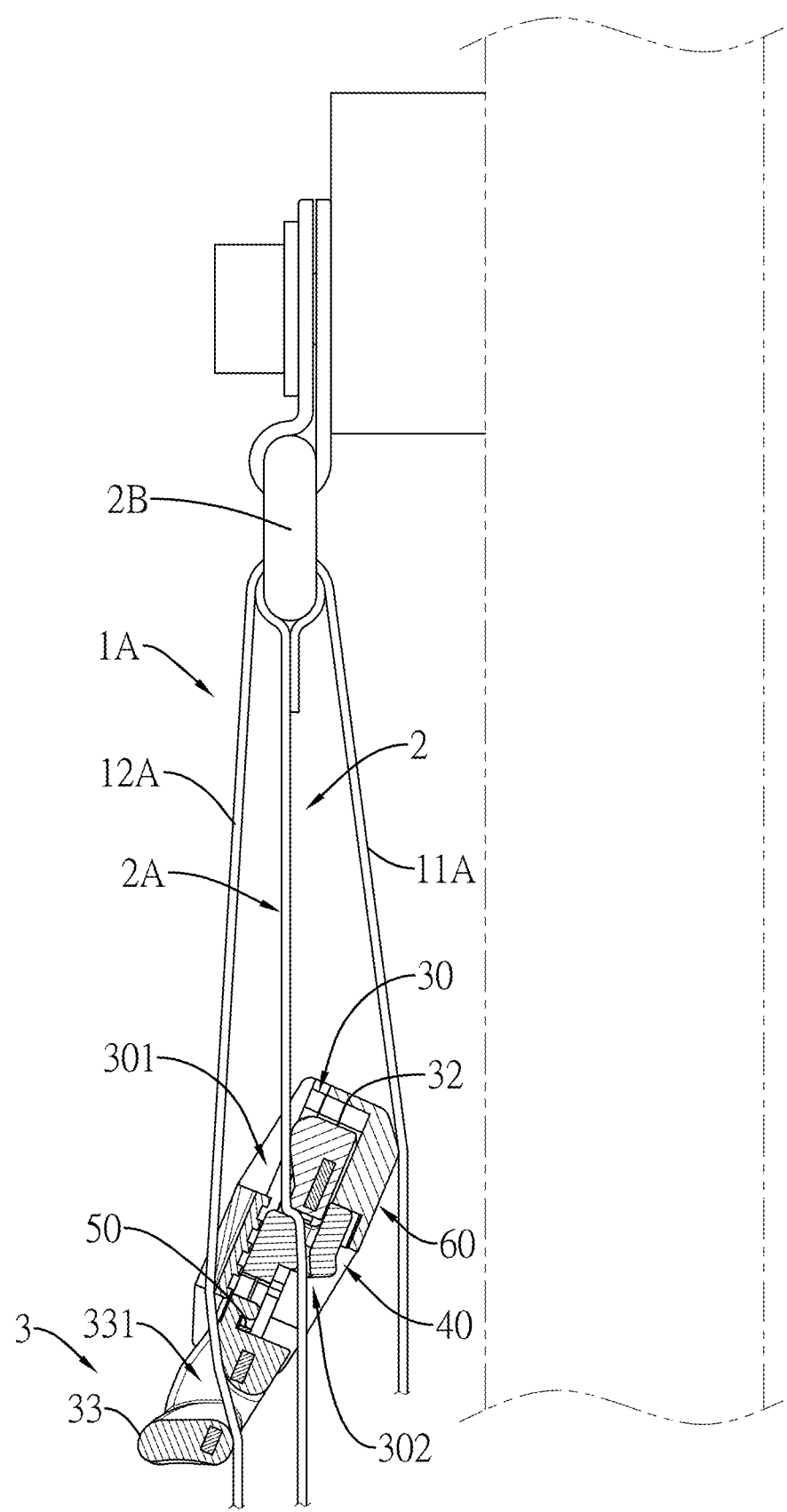
FIG. 26 is a sectional side view of the webbing height adjusting unit in the three-point seat belt system in FIGS. 17 and 18 with no occupant on a seat.

With reference to FIG. 26, when no occupant is seated on the seat, the main webbing 1A of the three-point seat belt system is retracted by the webbing retractor 1B to slide relative to the webbing height adjusting unit 3 along the webbing slot 331 and the D-loop 2B; the webbing height adjusting unit 3 keeps clamping the supplementary webbing 2A via the adjuster base 30 and the slider 40 pressed by the elastic member 50, which allows the webbing height adjusting unit 3 to be maintained at the proper height position after adjustment via the supplementary webbing 2A. Thereby, if the occupant leaves the seat after adjusting the webbing height adjusting unit 3 and the webbing height adjusting unit 3 retains its position without further adjustment by any other occupant, when the same occupant returns and refastens the main webbing 1A to secure the occupant's body on the seat with the front section 12A, the webbing height adjusting unit 3 still maintains the proper height position as previously adjusted; the occupant needs not readjust the webbing height adjusting unit 3.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A webbing height adjusting unit comprising:
    an adjuster base having
        a frame;
        a webbing-abutting portion formed on an upper section of the frame;
        a sliding space formed between the webbing-abutting portion and the frame;
        a webbing-mounting portion formed on a lower section of the frame; and
        a webbing slot formed in the frame and the webbing-mounting portion;
    a slider mounted in the sliding space of the adjuster base, configured to move up and down, and having an inclined slot;
    an elastic member disposed between the slider and the adjuster base and configured to provide a restoring force to allow the slider and the webbing-abutting portion of the adjuster base to clamp an object together; and
    an outer shell mounted on the adjuster base, configured to move up and down relative to the adjuster base, and being operable to actuate the slider and the adjuster base to move relatively so as to unclamp the object;
    wherein when the outer shell is released, the restoring force provided by the elastic member pushes the slider and the adjuster base to move relatively and re-clamp the object.

2. The webbing height adjusting unit as claimed in claim 1, wherein
    the outer shell has
        an operation space formed on an upper section of an interior of the outer shell; and
        two abutting portions located below two opposite sides of the operation space respectively;
    the webbing-abutting portion of the adjuster base is configured to move up and down in the operation space and is located above the two abutting portions;
    the outer shell is configured to be pulled upward and to push the webbing-abutting portion of the adjuster base with the two abutting portions to move the adjuster base relative to the slider; and
    the outer shell is operable to move downward, to abut the slider, and to allow the adjuster base and the slider to move relatively.

3. The webbing height adjusting unit as claimed in claim 2, wherein
    the adjuster base has two opposite sides being a first side and a second side respectively;
    an end of the webbing-abutting portion near the sliding space forms a webbing-abutting end located on the first side of the adjuster base;
    the slider has
        a first side board and a second side board arranged at a spaced interval and located at the first side and the second side of the adjuster base, respectively; and
        two connecting portions formed between the first side board and the second side board and located through the sliding space of the adjuster base;
    the inclined slot inclinedly extends between the two connecting portions along a direction from an end of the first side board near the webbing-abutting portion toward an end of the second side board near the webbing-mounting portion;
    a top end of the second side board is located higher than a top end of the first side board and a top opening of the inclined slot; and the first side board has
a clamping surface formed on an end of the first side board near the inclined slot and facing the webbing-abutting end of the webbing-abutting portion.

4. The webbing height adjusting unit as claimed in claim 3, wherein
the frame forms a through hole and a connecting hole located below the through hole;
the webbing-abutting portion is formed to cover the upper section of the frame and extends to a top end of the through hole;
the sliding space is formed between an edge of the through hole and the webbing-abutting portion; and
the webbing-mounting portion is formed to cover the lower section of the frame and covers the connecting hole to form the webbing slot.

5. The webbing height adjusting unit as claimed in claim 4, wherein
the webbing-mounting portion has
an abutting surface formed on a top of the webbing-mounting portion and extending to a lower section of the through hole; and
a position-limiting post protruding from the abutting surface and laterally extending toward the frame to form a gap between the position-limiting post and the abutting surface; and
the elastic member is an arc-shaped flat spring and has
a middle portion disposed in the gap between the position-limiting post and the abutting surface; and
two end portions connected to the middle portion and abutting a bottom of the first side board of the slider.

6. The webbing height adjusting unit as claimed in claim 3, wherein
the outer shell has
a first plate portion located beside the second side of the adjuster base and configured to abut a top of the second side board of the slider;
a second plate portion located beside the first side of the adjuster base;
a top side wall connected to a top end of the first plate portion, located beside the webbing-abutting portion of the adjuster base, located above the operation space, and having a bottom surface facing the operation space; and
a webbing-mounting space formed between the second plate portion and the top side wall and communicating with the sliding space from the first side of the adjuster base; and
an operation gap is formed between the bottom surface of the top side wall and the webbing-abutting portion.

7. The webbing height adjusting unit as claimed in claim 4, wherein
the outer shell has
a first plate portion located beside the second side of the adjuster base and configured to abut a top of the second side board of the slider;
a second plate portion located beside the first side of the adjuster base;
a top side wall connected to a top end of the first plate portion, located beside the webbing-abutting portion of the adjuster base, located above the operation space, and having a bottom surface facing the operation space; and
a webbing-mounting space formed between the second plate portion and the top side wall and communicating with the sliding space from the first side of the adjuster base; and
an operation gap is formed between the bottom surface of the top side wall and the webbing-abutting portion.

8. The webbing height adjusting unit as claimed in claim 5, wherein
the outer shell has
a first plate portion located beside the second side of the adjuster base and configured to abut a top of the second side board of the slider;
a second plate portion located beside the first side of the adjuster base;
a top side wall connected to a top end of the first plate portion, located beside the webbing-abutting portion of the adjuster base, located above the operation space, and having a bottom surface facing the operation space; and
a webbing-mounting space formed between the second plate portion and the top side wall and communicating with the sliding space from the first side of the adjuster base; and
an operation gap is formed between the bottom surface of the top side wall and the webbing-abutting portion.

9. The webbing height adjusting unit as claimed in claim 6, wherein the outer shell has
two side walls located on two opposite sides of the first plate portion and top side wall respectively, and each one of the two side walls having a slip-proof surface on its periphery; and
a receiving groove formed by the first plate portion and configured for the second side board of the slider to be inserted thereinto.

10. The webbing height adjusting unit as claimed in claim 7, wherein the outer shell has
two side walls located on two opposite sides of the first plate portion and top side wall respectively, and each one of the two side walls having a slip-proof surface on its periphery; and
a receiving groove formed by the first plate portion and configured for the second side board of the slider to be inserted thereinto.

11. The webbing height adjusting unit as claimed in claim 8, wherein the outer shell has
two side walls located on two opposite sides of the first plate portion and the top side wall respectively, and each one of the two side walls having a slip-proof surface on its periphery; and
a receiving groove formed by the first plate portion and configured for the second side board of the slider to be inserted thereinto.

12. The webbing height adjusting unit as claimed in claim 6, wherein the outer shell has a bridge portion connected to the second plate portion and forming a space between the bridge portion and the second plate portion.

13. The webbing height adjusting unit as claimed in claim 7, wherein the outer shell has a bridge portion connected to the second plate portion and forming a space between the bridge portion and the second plate portion.

14. The webbing height adjusting unit as claimed in claim 8, wherein the outer shell has a bridge portion connected to the second plate portion and forming a space between the bridge portion and the second plate portion.

15. A webbing height adjusting device adapted to be connected to a main webbing extending out from a webbing retractor of a three-point seat belt system of a vehicle, and the webbing height adjusting device comprising:
a supplementary webbing component configured to be mounted inside the vehicle and having a D-loop configured to be connected to an upper position in the vehicle and configured for the main webbing to be mounted therethrough, thereby the D-loop dividing the main webbing to a rear section and a front section;

a supplementary webbing configured to be located between the rear section and the front section of the main webbing and having
  a top end connected to the D-loop; and
  a bottom end opposite to the top end and configured to be connected to a lower position in the vehicle;

a webbing height adjusting unit disposed below the D-loop, configured to be connected to the front section of the main webbing and the supplementary webbing to form an adjustable top position, and having
  an adjuster base having
    a frame;
    a webbing-abutting portion formed on an upper section of the frame;
    a sliding space formed between the webbing-abutting portion and the frame;
    a webbing-mounting portion formed on a lower section of the frame;
    a webbing slot formed in the frame and the webbing-mounting portion configured for the front section of the main webbing to be mounted therethrough;
  a slider mounted in the sliding space of the adjuster base, configured to move up and down, and having an inclined slot configured for the supplementary webbing to be mounted therethrough;
  an elastic member disposed between the slider and the adjuster base and configured to provide a restoring force to allow the slider and the webbing-abutting portion of the adjuster base to clamp the supplementary webbing together; and
  an outer shell mounted to the adjuster base, configured to move up and down relative to the adjuster base, and being operable to actuate the slider and the adjuster base to move relatively so as to unclamp the supplementary webbing;

wherein when the outer shell is released, the restoring force provided by the elastic member pushes the slider and the adjuster base to move relatively and re-clamp the supplementary webbing.

16. The webbing height adjusting device as claimed in claim 15, wherein
the outer shell has
  an operation space formed on an upper section of an interior of the outer shell; and
  two abutting portions located below two opposite sides of the operation space respectively;
the webbing-abutting portion of the adjuster base is configured to move up and down in the operation space and is located above the two abutting portions;
the outer shell is configured to be pulled upward and to push the webbing-abutting portion of the adjuster base with the two abutting portions to move the adjuster base relative to the slider; and
the outer shell is operable to move downward, to abut the slider, and to allow the adjuster base and the slider to move relatively.

17. The webbing height adjusting device as claimed in claim 16, wherein
the adjuster base has two opposite sides being a first side and a second side respectively;
the adjuster base is configured for the front section of the main webbing and the supplementary webbing to extend thereinto from the first side of the adjuster base and to extend thereout from the second side of the adjuster base;
an end of the webbing-abutting portion near the sliding space forms a webbing-abutting end;
the slider has
  a first side board and a second side board arranged at a spaced interval and located at the first side and the second side of the adjuster base, respectively; and
  two connecting portions formed between the first side board and the second side board and located through the sliding space of the adjuster base;
the inclined slot inclinedly extends between the two connecting portions along a direction from an end of the first side board near the webbing-abutting portion toward an end of the second side board near the webbing-mounting portion;
a top end of the second side board is located higher than a top end of the first side board and a top opening of the inclined slot; and
the first side board has a clamping surface formed on an end of the first side board near the inclined slot and configured to clamp the supplementary webbing with the webbing-abutting end of the webbing-abutting portion.

18. The webbing height adjusting device as claimed in claim 17, wherein
the frame forms a through hole and a connecting hole located below the through hole;
the webbing-abutting portion is formed to cover the upper section of the frame and extends to a top end of the through hole;
the sliding space is formed between an edge of the through hole and the webbing-abutting portion; and
the webbing-mounting portion is formed to cover the lower section of the frame and covers the connecting hole to form the webbing slot.

19. The webbing height adjusting device as claimed in claim 18, wherein
the webbing-mounting portion has
  an abutting surface formed on a top of the webbing-mounting portion and extending to a lower section of the through hole; and
  a position-limiting post protruding from the abutting surface and laterally extending toward the frame to form a gap between the position-limiting post and the abutting surface; and
the elastic member is an arc-shaped flat spring and has
  a middle portion disposed in the gap between the position-limiting post and the abutting surface; and
  two end portions connected to the middle portion and abutting a bottom of the first side board of the slider.

20. The webbing height adjusting device as claimed in claim 17, wherein
the outer shell has
  a first plate portion located beside the second side of the adjuster base and configured to abut a top of the second side board of the slider;
  a second plate portion located beside the first side of the adjuster base;
  a top side wall connected to a top end of the first plate portion, located beside the webbing-abutting portion of the adjuster base, located above the operation space, and having a bottom surface facing the operation space; and a webbing-mounting space formed between the second plate portion and the top side wall and communicating with the sliding space from the first side of the adjuster base; and an operation gap is formed between the bottom surface of the top side wall and the webbing-abutting portion.

21. The webbing height adjusting device as claimed in claim 18, wherein the outer shell has a first plate portion located beside the second side of the adjuster base and configured to abut a top of the second side board of the slider;

a second plate portion located beside the first side of the adjuster base;

a top side wall connected to a top end of the first plate portion, located beside the webbing-abutting portion of the adjuster base, located above the operation space, and having a bottom surface facing the operation space; and a webbing-mounting space formed between the second plate portion and the top side wall and communicating with the sliding space from the first side of the adjuster base; and an operation gap is formed between the bottom surface of the top side wall and the webbing-abutting portion.

22. The webbing height adjusting device as claimed in claim 19, wherein the outer shell has a first plate portion located beside the second side of the adjuster base and configured to abut a top of the second side board of the slider;

a second plate portion located beside the first side of the adjuster base;

a top side wall connected to a top end of the first plate portion, located beside the webbing-abutting portion of the adjuster base, located above the operation space, and having a bottom surface facing the operation space; and a webbing-mounting space formed between the second plate portion and the top side wall and communicating with the sliding space from the first side of the adjuster base; and an operation gap is formed between the bottom surface of the top side wall and the webbing-abutting portion.

23. The webbing height adjusting device as claimed in claim 20, wherein the outer shell has two side walls located on two opposite sides of the first plate portion and the top side wall respectively, and each one of the two side walls having a slip-proof surface on its periphery; and a receiving groove formed by the first plate portion and configured for the second side board of the slider to be inserted thereinto.

24. The webbing height adjusting device as claimed in claim 21, wherein the outer shell has two side walls located on two opposite sides of the first plate portion and the top side wall respectively, and each one of the two side walls having a slip-proof surface on its periphery; and a receiving groove formed by the first plate portion and configured for the second side board of the slider to be inserted thereinto.

25. The webbing height adjusting device as claimed in claim 22, wherein the outer shell has two side walls located on two opposite sides of the first plate portion and the top side wall, and each one of the two side walls having a slip-proof surface on its periphery; and a receiving groove formed by the first plate portion and configured for the second side board of the slider to be inserted thereinto.

26. The webbing height adjusting device as claimed in claim 20, wherein the outer shell has a bridge portion connected to the second plate portion and forming a space between the bridge portion and the second plate portion configured for the main webbing to be mounted therethrough.

27. The webbing height adjusting device as claimed in claim 21, wherein the outer shell has a bridge portion connected to the second plate portion and forming a space between the bridge portion and the second plate portion configured for the main webbing to be mounted therethrough.

28. The webbing height adjusting device as claimed in claim 22, wherein the outer shell has a bridge portion connected to the second plate portion and forming a space between the bridge portion and the second plate portion configured for the main webbing to be mounted therethrough.

* * * * *